United States Patent
Kim et al.

(10) Patent No.: US 10,635,373 B2
(45) Date of Patent: *Apr. 28, 2020

(54) DISPLAY APPARATUS AND METHOD OF CONTROLLING THE SAME

(71) Applicant: SAMSUNG ELECTRONICS CO., LTD., Suwon-si (KR)

(72) Inventors: Soo-hong Kim, Seoul (KR); Young-mo Kang, Seoul (KR); Ha-na Kim, Suwon-si (KR); Hyun-suk Kim, Seoul (KR); Jun-yong Park, Suwon-si (KR); Jee-hoon Park, Seoul (KR); Sung-do Son, Yongin-si (KR); Su-won Shin, Yongin-si (KR); Hyun-yong Choi, Suwon-si (KR); You-na Choo, Seongnam-si (KR); Soo-hyun Whang, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/840,274

(22) Filed: Dec. 13, 2017

(65) Prior Publication Data

US 2018/0165052 A1    Jun. 14, 2018

(30) Foreign Application Priority Data

Dec. 14, 2016 (KR) .......................... 10-2016-0170467
Dec. 21, 2016 (KR) .......................... 10-2016-0175797
Dec. 23, 2016 (KR) .......................... 10-2016-0178445

(51) Int. Cl.
*G06F 3/14* (2006.01)
*G06F 3/147* (2006.01)
(Continued)

(52) U.S. Cl.
CPC ........ *G06F 3/1446* (2013.01); *G06F 3/04845* (2013.01); *G06F 3/14* (2013.01);
(Continued)

(58) Field of Classification Search
CPC .............................. G06F 3/147; G09G 5/373
See application file for complete search history.

(56) References Cited

U.S. PATENT DOCUMENTS

| 5,532,754 A | 7/1996 | Young et al. |
| 5,784,498 A | 7/1998 | Venable |

(Continued)

FOREIGN PATENT DOCUMENTS

| CN | 104639748 A | 5/2015 |
| EP | 0 772 157 A2 | 5/1997 |

(Continued)

OTHER PUBLICATIONS

Search Report dated Mar. 22, 2018 issued by the International Searching Authority in counterpart International Patent Application No. PCT/KR2017/014634 (PCT/ISA/210).

(Continued)

*Primary Examiner* — Paulos M Natnael
(74) *Attorney, Agent, or Firm* — Sughrue Mion, PLLC

(57) ABSTRACT

A display apparatus, including a display configured to display an image, at least one sensor configured to generate sensing data relating to at least one from among a direction and an intensity of external light projected onto the display from an external light source disposed around the display, a memory configured to store background image data relating to a background image of a background area behind the display, and a processor configured to generate a content screen based on the background image data and the sensing data and control the display to display the content screen, wherein the content screen may include at least one graphic (Continued)

object and a shadow corresponding to the at least one graphic object disposed on the background image, and at least one of a position and a shade of the shadow is changed in response to a change in the sensing data.

21 Claims, 34 Drawing Sheets

(51) Int. Cl.
| | | |
|---|---|---|
| *G06F 3/0484* | (2013.01) | |
| *G09G 3/20* | (2006.01) | |
| *G09G 5/14* | (2006.01) | |
| *H04N 5/445* | (2011.01) | |
| *G09G 5/00* | (2006.01) | |
| *G09G 3/34* | (2006.01) | |
| *H04N 9/64* | (2006.01) | |

(52) U.S. Cl.
CPC ........... *G06F 3/147* (2013.01); *G09G 3/2003* (2013.01); *G09G 5/00* (2013.01); *G09G 5/14* (2013.01); *H04N 5/44513* (2013.01); *G09G 3/3406* (2013.01); *G09G 2320/0626* (2013.01); *G09G 2320/0666* (2013.01); *G09G 2330/022* (2013.01); *G09G 2340/0464* (2013.01); *G09G 2340/14* (2013.01); *G09G 2360/144* (2013.01); *G09G 2360/145* (2013.01); *H04N 9/64* (2013.01); *H04N 2005/44521* (2013.01)

(56) References Cited

U.S. PATENT DOCUMENTS

| | | | |
|---|---|---|---|
| 6,529,280 B1* | 3/2003 | Yahashi | G01B 11/005 |
| | | | 356/602 |
| 8,437,567 B2 | 5/2013 | Jeong et al. | |
| 9,076,221 B2 | 7/2015 | Xiong et al. | |
| 9,201,467 B2* | 12/2015 | Fujii | G06T 19/20 |
| 9,390,646 B2 | 7/2016 | Park et al. | |
| 9,392,177 B2 | 7/2016 | Takasumi et al. | |
| 9,857,867 B2 | 1/2018 | Kumar et al. | |
| 9,965,999 B1 | 5/2018 | Barnes | |
| 10,122,969 B1* | 11/2018 | Lim | H04N 7/147 |
| 2003/0160884 A1 | 8/2003 | Hanson | |
| 2006/0007511 A1 | 1/2006 | Koyama et al. | |
| 2008/0002216 A1 | 1/2008 | Matsushima | |
| 2010/0066712 A1 | 3/2010 | Tomonaga | |
| 2011/0149181 A1 | 6/2011 | Kim et al. | |
| 2012/0013646 A1 | 1/2012 | Ichioka et al. | |
| 2012/0038663 A1 | 2/2012 | Gustafsson et al. | |
| 2012/0120103 A1 | 5/2012 | Border et al. | |
| 2012/0133790 A1 | 5/2012 | Sams | |
| 2012/0188243 A1* | 7/2012 | Fujii | G06T 19/20 |
| | | | 345/426 |
| 2013/0265306 A1 | 10/2013 | Landweber | |
| 2014/0063052 A1 | 3/2014 | Choi | |
| 2014/0152706 A1 | 6/2014 | Park et al. | |
| 2014/0204023 A1 | 7/2014 | Kumar et al. | |
| 2014/0232625 A1 | 8/2014 | Murase et al. | |
| 2014/0282159 A1 | 9/2014 | Lee et al. | |
| 2014/0306980 A1 | 10/2014 | Won et al. | |
| 2014/0365912 A1* | 12/2014 | Shaw | G06F 3/04817 |
| | | | 715/748 |
| 2014/0365919 A1* | 12/2014 | Shaw | H04L 12/1822 |
| | | | 715/753 |
| 2015/0145887 A1 | 5/2015 | Forutanpour et al. | |
| 2015/0260505 A1 | 9/2015 | Nagano et al. | |
| 2016/0011737 A1* | 1/2016 | Kang | G06F 3/0488 |
| | | | 715/808 |
| 2016/0035138 A1 | 2/2016 | Kim et al. | |
| 2016/0041721 A1* | 2/2016 | Fujii | G06T 19/20 |
| | | | 715/765 |
| 2016/0097935 A1 | 4/2016 | Chien et al. | |
| 2016/0117972 A1 | 4/2016 | Yoshiyama et al. | |
| 2016/0180558 A1 | 6/2016 | Kim | |
| 2017/0357397 A1 | 12/2017 | Masumoto | |
| 2018/0101222 A1 | 4/2018 | Kumar et al. | |
| 2018/0103299 A1 | 4/2018 | Kim et al. | |
| 2018/0164981 A1* | 6/2018 | Park | G06F 3/04812 |
| 2018/0165052 A1 | 6/2018 | Kim et al. | |
| 2018/0174555 A1* | 6/2018 | Lee | G06F 3/14 |
| 2018/0247613 A1* | 8/2018 | Lee | G09G 5/026 |
| 2018/0300770 A1 | 10/2018 | Kamel et al. | |
| 2018/0330697 A1* | 11/2018 | Lee | G09G 5/373 |
| 2018/0342224 A1 | 11/2018 | Beon et al. | |
| 2019/0011691 A1* | 1/2019 | Peyman | G02B 26/004 |

FOREIGN PATENT DOCUMENTS

| | | |
|---|---|---|
| EP | 2 128 686 A1 | 12/2009 |
| EP | 2 129 084 A1 | 12/2009 |
| EP | 3 319 076 A1 | 5/2018 |
| JP | 2006-189708 A | 7/2006 |
| JP | 2007-201580 A | 8/2007 |
| JP | 2007324974 A | 12/2007 |
| JP | 200921771 A | 1/2009 |
| JP | 2010-72141 A | 4/2010 |
| JP | 2011180964 A | 9/2011 |
| JP | 2012-155556 A | 8/2012 |
| JP | 2013168922 A | 8/2013 |
| JP | 2014114071 A | 6/2014 |
| JP | 2016049998 A | 4/2016 |
| KR | 2000-0000145 U | 1/2000 |
| KR | 2000-0009068 U | 5/2000 |
| KR | 1020090075234 A | 7/2009 |
| KR | 1020120063987 A | 6/2012 |
| KR | 10-2013-0006878 A | 1/2013 |
| KR | 101222318 B1 | 1/2013 |
| KR | 1020140028558 A | 3/2014 |
| KR | 10-2014-0060365 A | 5/2014 |
| KR | 10-2014-0070120 A | 6/2014 |
| KR | 10-2014-0094393 A | 7/2014 |
| KR | 10-1495165 B1 | 2/2015 |
| KR | 1020150044787 A | 4/2015 |
| KR | 1020150054059 A | 5/2015 |
| KR | 1020160002461 A | 1/2016 |
| KR | 1020160047972 A | 5/2016 |
| KR | 10-2016-0074288 A | 6/2016 |
| KR | 10-2018-0039394 A | 4/2018 |
| KR | 10-2018-0072337 A | 6/2018 |
| KR | 10-2018-0074405 A | 7/2018 |
| WO | 2015056932 A1 | 4/2015 |
| WO | 2015077591 A1 | 5/2015 |
| WO | 2016/124146 A1 | 11/2016 |
| WO | 2017/052102 A1 | 3/2017 |

OTHER PUBLICATIONS

Written Opinion dated Mar. 22, 2018 issued by the International Searching Authority in counterpart International Patent Application No. PCT/KR2017/014634 (PCT/ISA/237).
Communication dated Jun. 13, 2019, issued by the Korean Patent Office in counterpart Korean Application No. 10-2016-0130645.
Communication dated Jun. 26, 2019, issued by the United States Patent and Trademark Office in counterpart U.S. Appl. No. 15/704,180.
Communication dated Jul. 22, 2019, issued by the European Patent Office in counterpart European Application No. 17881422.4.
International Search Report, issued by International Searching Authority in corresponding International Application No. PCT/KR2017/009962, dated Dec. 27, 2017 (PCT/ISA/210).
Communication dated Feb. 22, 2018, from the European Patent Office in counterpart European Application No. 17191786.7.
Written Opinion, issued by International Searching Authority in corresponding International Application No. PCT/KR2017/009962, dated Dec. 27, 2017 (PCT/ISA/237).
Communication dated Feb. 8, 2019 issued by the European Intellectual Property Office in counterpart European Application No. 17 191 786.7.

(56) References Cited

OTHER PUBLICATIONS

Communication dated Jan. 28, 2019 issued by the Korean Intellectual Property Office in counterpart Korean Application No. 10-2016-0130645.
Communication dated Jan. 14, 2019, issued by the United States Patent and Trademark Office in counterpart U.S. Appl. No. 15/704,180.
International Search Report (PCT/ISA/210) dated Nov. 19, 2019 issued by the International Searching Authority in International Application No. PCT/KR2019/009316.
Written Opinion (PCT/ISA/237) dated Nov. 19, 2019 issued by the International Searching Authority in International Application No. PCT/KR2019/009316.
Communication dated Oct. 21, 2019, issued by the USPTO in counterpart U.S. Appl. No. 15/704,180.
Communication dated Jan. 22, 2020, issued by the European Patent Office in counterpart European Application No. 17 191 786.7.
Communication dated Feb. 4, 2020, issued by the European Patent Office in counterpart European Application No. 19186608.6.

* cited by examiner

FIG. 1
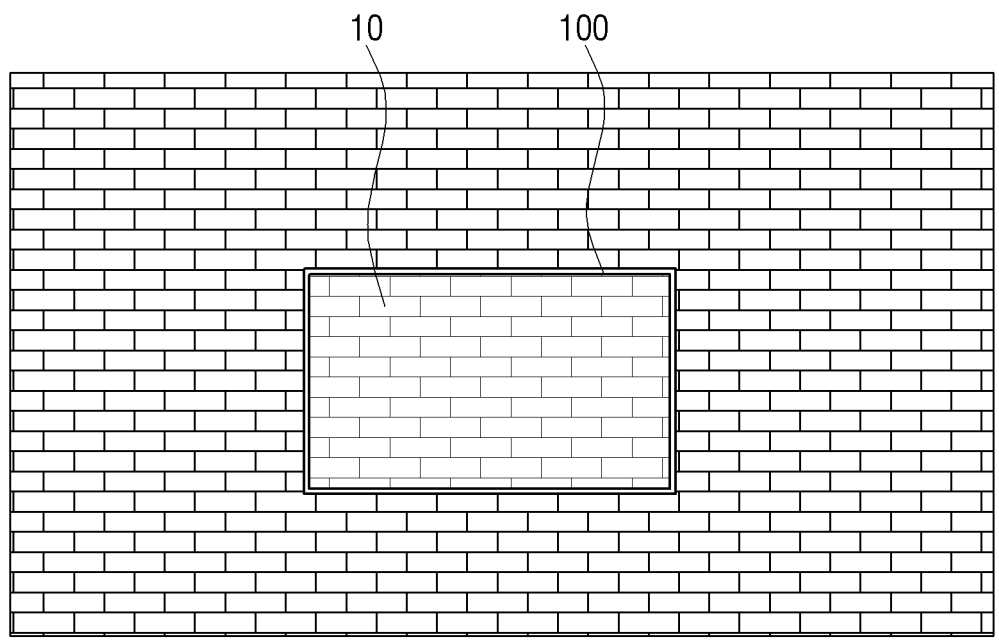
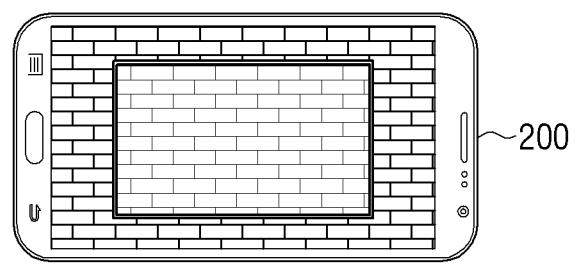

FIG. 19
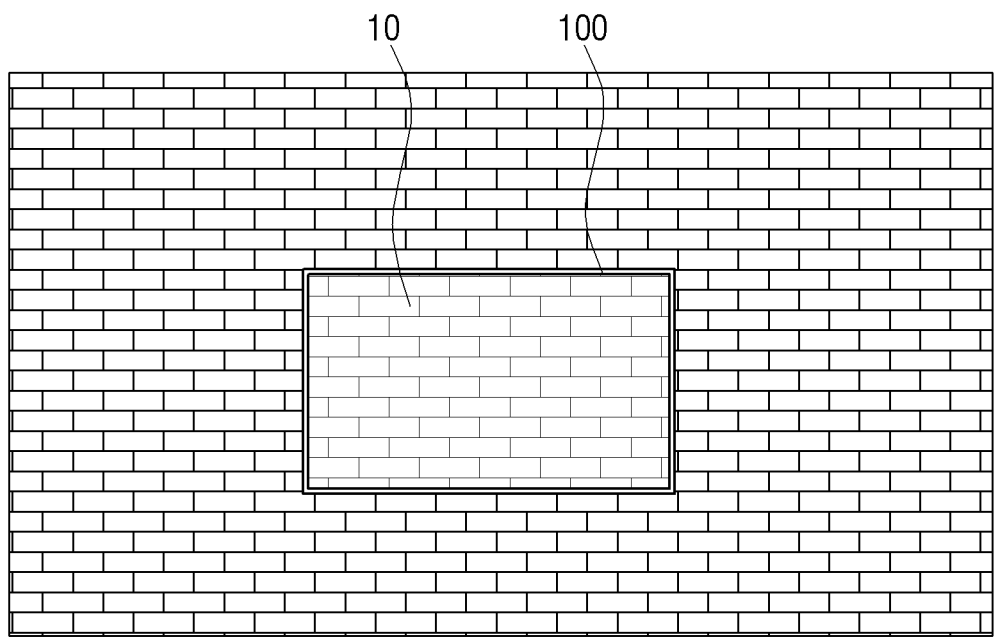
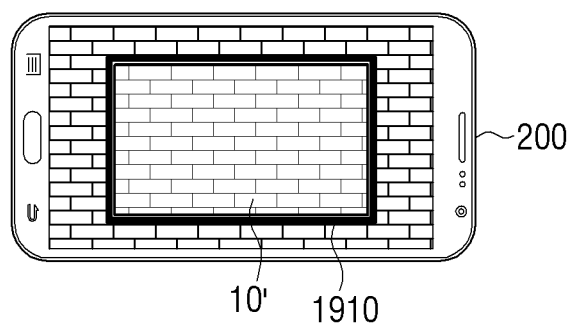

FIG. 20
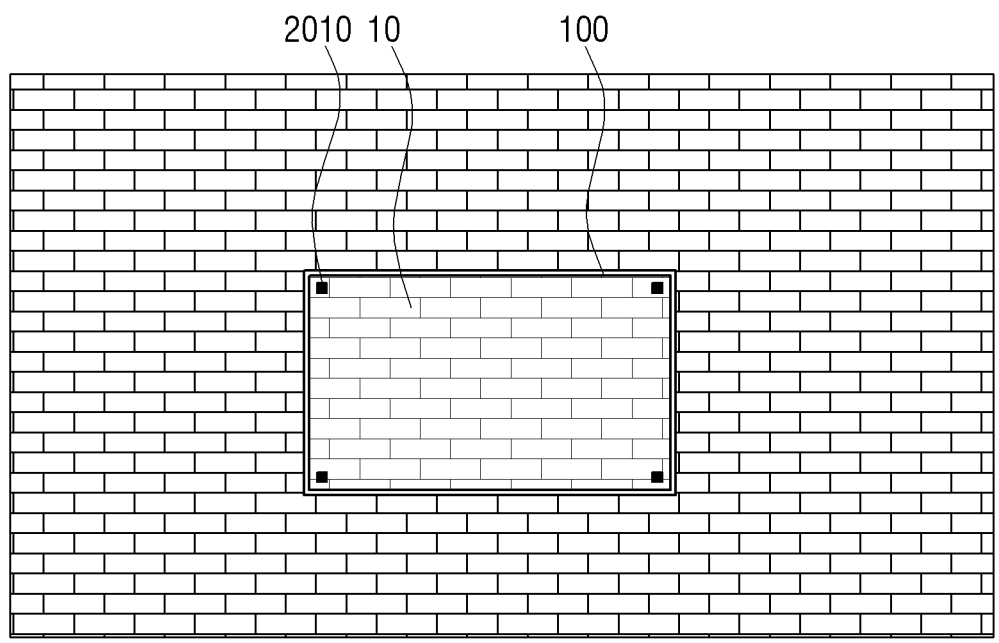
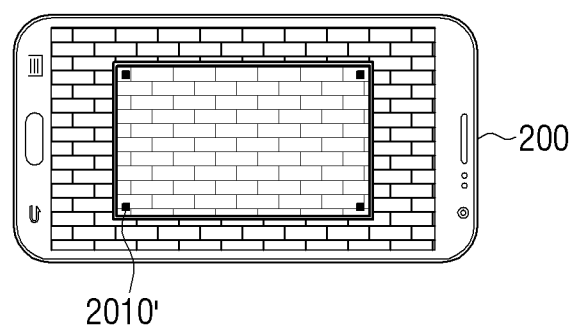

DISPLAY APPARATUS AND METHOD OF CONTROLLING THE SAME

CROSS-REFERENCE TO RELATED APPLICATIONS

This application claims priority from Korean Patent Application No. 10-2016-0175797, filed on Dec. 21, 2016, in the Korean Intellectual Property Office, Korean Patent Application No. 10-2016-0178445, filed on Dec. 23, 2016, in the Korean Intellectual Property Office, and Korean Patent Application No. 10-2016-0170467, filed on Dec. 14, 2016, in the Korean Intellectual Property Office, the disclosures of which are incorporated herein by reference in their entirety.

BACKGROUND OF THE INVENTION

Field of the Invention

Apparatuses and methods consistent with exemplary embodiments relate to a display apparatus and a method of controlling the same, and more particularly, to a display apparatus for displaying a background image corresponding to a background area behind the display apparatus and a method of controlling the same.

Description of Related Art

Various user experiences relating to display apparatuses have been recently developed. In particular, a user may be provided with a visual effect in which a display appears as a transparent window, by acquiring a background image a wall where a display apparatus is installed and displaying the acquired background image through the display apparatus.

However, a problem occurs in which a change in a surrounding environment state, for example an illumination change, or the background image displayed on a screen of the display apparatus appears different from the background of the wall where the display apparatus is installed due to a color temperature or the like applied to the display apparatus. Therefore, the visual effect in which the display of the display apparatus appears as a transparent window is not maximised.

Also, if an unnecessary area, for example a defect area, such as a socket, a scratch, a stain, a nail mark, or the like, exists on a wallpaper behind the display apparatus, the defect area is exposed on the screen displaying the background image and thus causes a problem of spoiling a desired view.

SUMMARY

Exemplary embodiments may overcome the above disadvantages and other disadvantages. Also, exemplary embodiments are not required to overcome the disadvantages described above, and exemplary embodiments may not overcome any of the problems described above.

Exemplary embodiments provide adaptive processing and providing of a content screen including a background image displayed on a display apparatus according to external light projected from an external illumination.

Exemplary embodiments provide a display apparatus capable of removing a defect area from a background image of a background area behind the display apparatus, an electronic device, and a display system including the display apparatus and the electronic device, and a method of controlling the display apparatus.

Exemplary embodiments provide a visual effect like a display of a display apparatus appears as a transparent window.

According to an aspect of an exemplary embodiment, a display apparatus includes a display configured to display an image, at least one sensor configured to generate sensing data relating to at least one from among a direction and an intensity of external light projected onto the display from an external light source disposed around the display, a memory configured to store background image data relating to a background image of a background area behind the display, and a processor configured to generate a content screen based on the background image data and the sensing data and control the display to display the content screen, wherein the content screen may include at least one graphic object and a shadow corresponding to the at least one graphic object disposed on the background image, and at least one of a position and a shade of the shadow is changed in response to a change in the sensing data.

The display apparatus may further include a bezel disposed at an edge of the display, and an outer frame configured to cover the bezel, wherein the processor may be further configured to control the display to display an outer frame shadow in an area at an edge of the content screen, the edge corresponding to the outer frame.

The content screen may include an object layer including the at least one graphic object, a shadow layer including the shadow, and a background image layer including the background image.

The processor may be further configured to control the display to sequentially arrange the background image layer, the shadow layer, and the object layer, so that the object layer, the shadow layer, and the background image layer are sequentially displayed from a front position.

The processor may be further configured to perform an image correction with respect to the at least one graphic object according to at least one of the direction and the intensity of the external light sensed by the at least one sensor.

In response to a plurality of graphic objects being included in the content screen, the processor may be further configured to perform a plurality of image corrections with respect to the plurality of graphic objects according to a plurality of types of the plurality of graphic objects.

The processor may be further configured to generate the shadow based on whether the background image includes a pattern.

The processor may be further configured to operate in one of a background mode and a normal mode, and to control the display to display a content screen including the background image while operating in the background mode.

The memory may be further configured to store position data relating to a first area of the background image, the first area being surrounded by a second area including a first image pattern, wherein the processor may be further configured to extract a third area, which includes a second image pattern matching the first image pattern, from the background image, based on the position data relating to the first area, determine a fourth area corresponding to the first area in the background image based on the extracted third area, and control the display to display a corrected background image in which the first area is replaced by the fourth area.

The background image may include a repeated image pattern that is repeated at least twice, and the first area may be at least one area selected by a user.

The processor may be further configured to determine an area excluding the first area as the second area.

The processor may be further configured to extract the third area, from the background image as a result of determining that the first image pattern matches the second image pattern using feature information of the first image pattern.

The processor may be further configured to calculate brightness data of the second area, and to correct a brightness of the fourth area based on the calculated brightness data.

The processor may be further configured to apply a blending effect based on the corrected brightness of the fourth area and the brightness data of the second area.

The display apparatus may further include a communicator configured to perform a data communication with an electronic device, wherein in response to correction data of the background image being received from the electronic device, the processor may be further configured to correct the background image based on the received correction data.

The correction data may be generated by comparing a display area displaying the background image with a surrounding area in an correction image acquired by capturing an area comprising the display apparatus displaying the background image.

The correction data may include a correction value for matching a pixel value of the display area with a pixel value of the surrounding area by comparing the pixel value of the display area and the pixel value of the surrounding area.

The correction data may include a correction value for matching a first pixel value of at least one pixel included in a preset first area of the display area with a second pixel value of at least one pixel included in a preset second area of the surrounding area, by comparing the first pixel value with the second pixel value.

The correction image may include indicators for identifying the display apparatus, and distinguishing the display area displaying the background image from the surrounding area.

In response to re-correction data relating to the corrected background image being received, the processor may be further configured to re-correct the corrected background image based on the received re-correction data.

According to another aspect of an exemplary embodiment, a method for controlling a display apparatus includes capturing a background image of a background area behind the display apparatus, displaying a content screen including the background image, identifying a defect area in the background image, identifying a pattern in an area surrounding the defect area, identifying a replacement area based on the pattern, generating a corrected background image by replacing the defect area using the identified replacement area, displaying the corrected background image.

The method may further include detecting external light projected onto the display apparatus, and correcting the corrected background image based on the detected external light.

Additional and/or other aspects and advantages of exemplary embodiments will be set forth in part in the description which follows and, in part, will be obvious from the description, or may be learned by practice of exemplary embodiments.

BRIEF DESCRIPTION OF THE DRAWING FIGURES

The above and/or other aspects will be more apparent by describing certain exemplary embodiments with reference to the accompanying drawings, in which:

FIG. 1 is a system diagram for providing a background image according to an exemplary embodiment;

Figure 10:
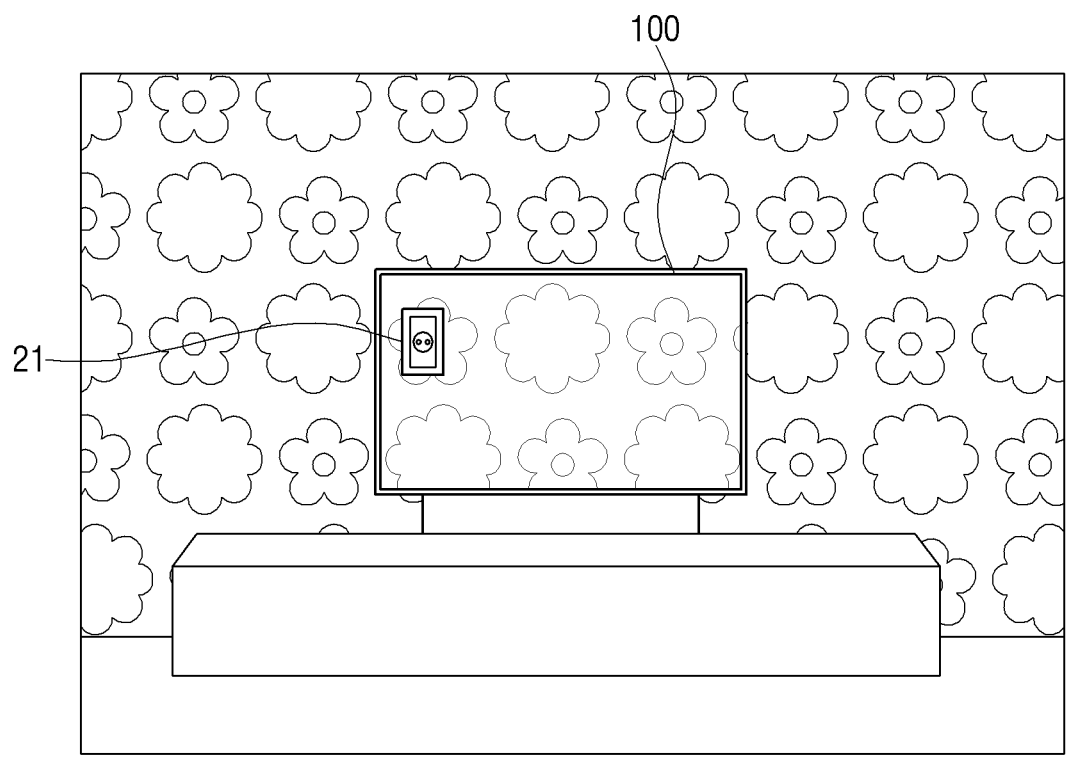
Figure 11:
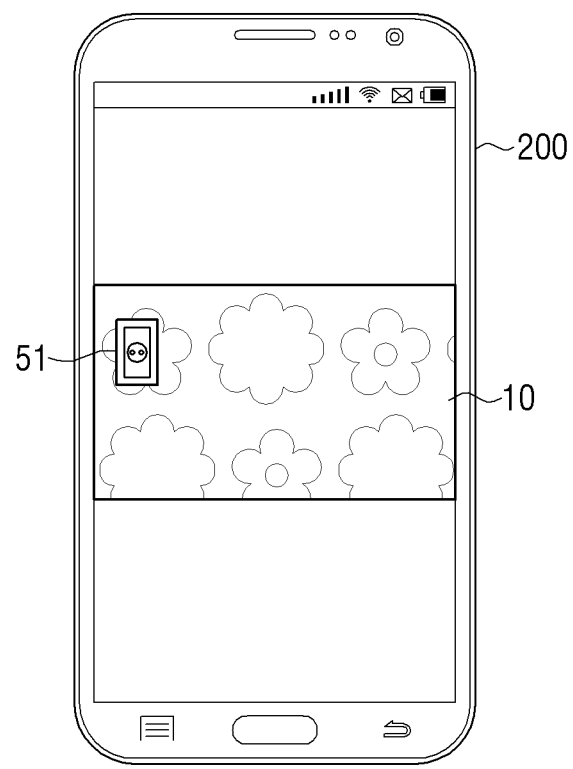
Figure 12:
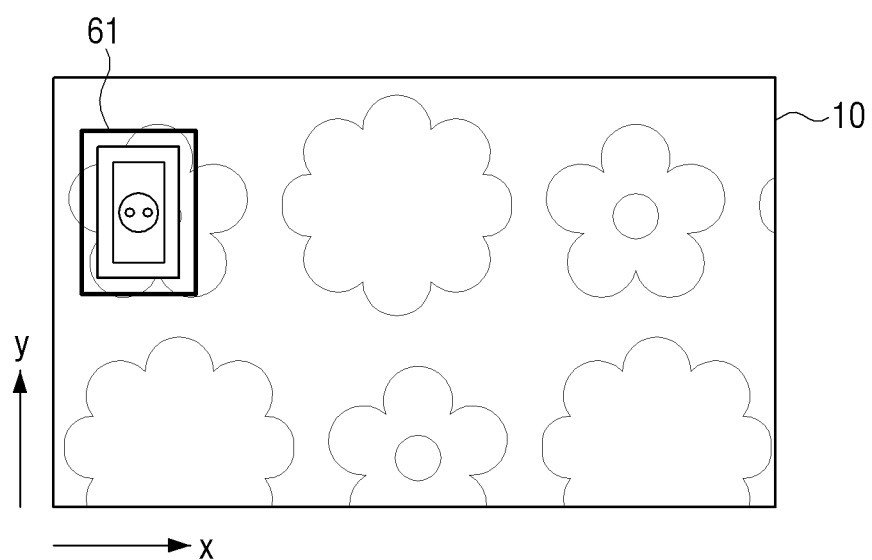
Figure 13:
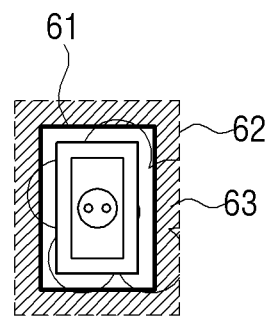
Figure 14:
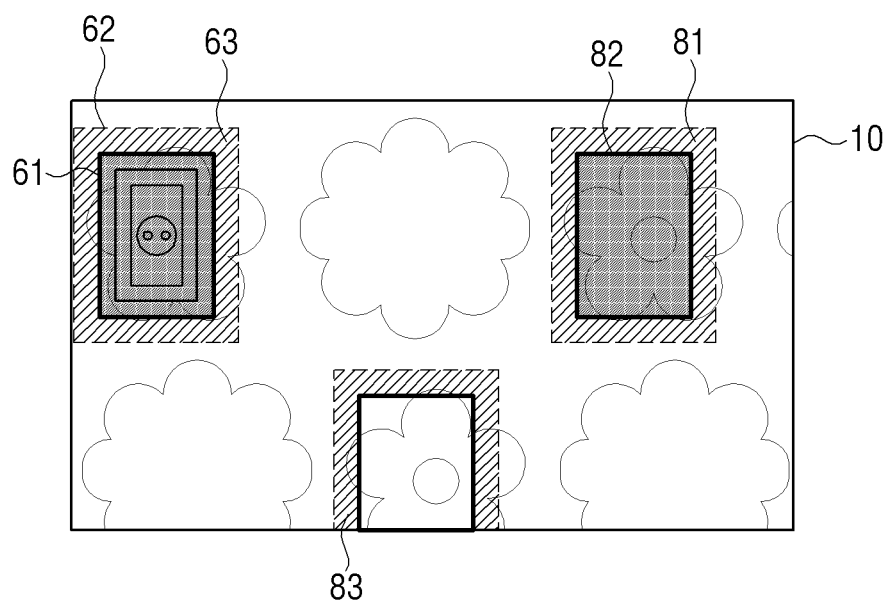
Figure 15:
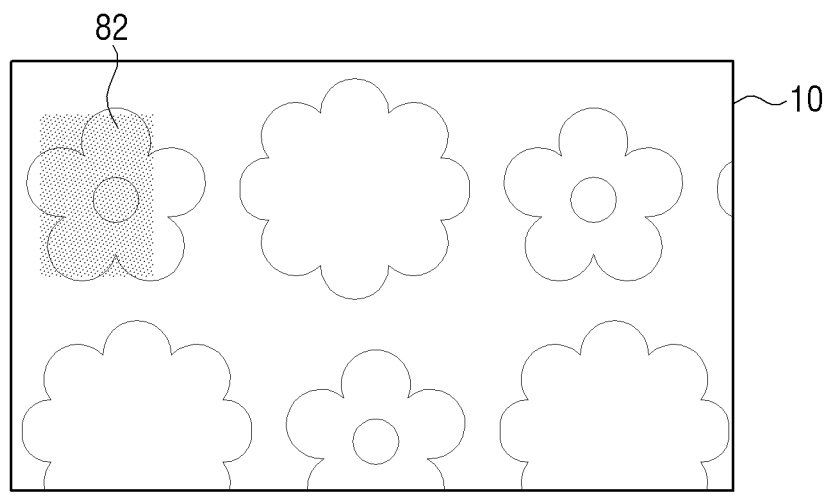
Figure 16:
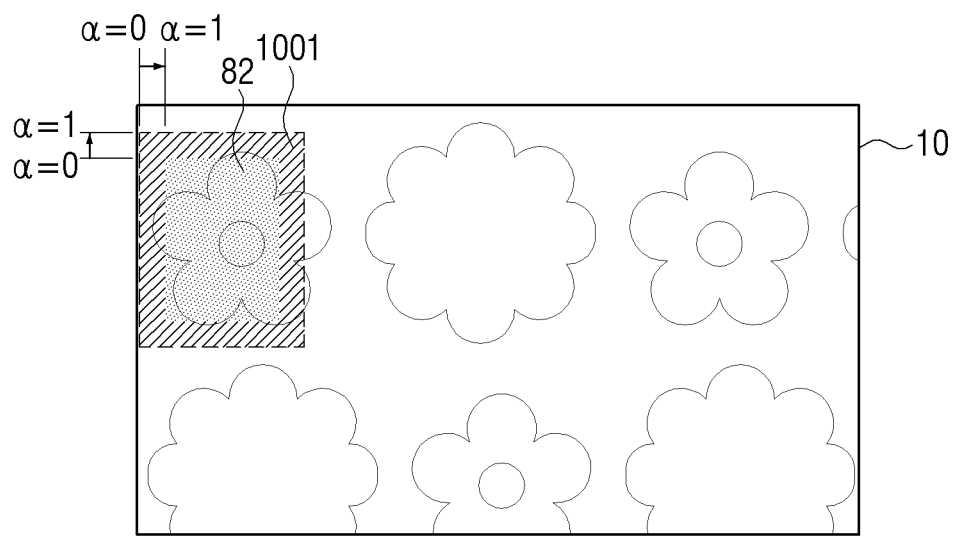
Figure 17:
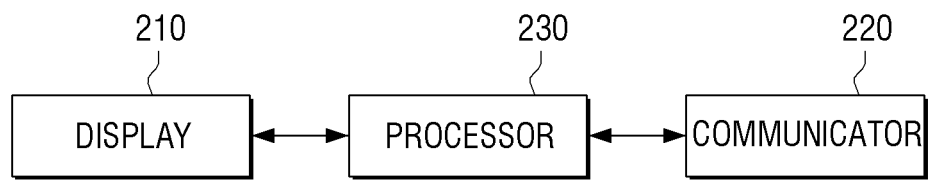
Figure 18:
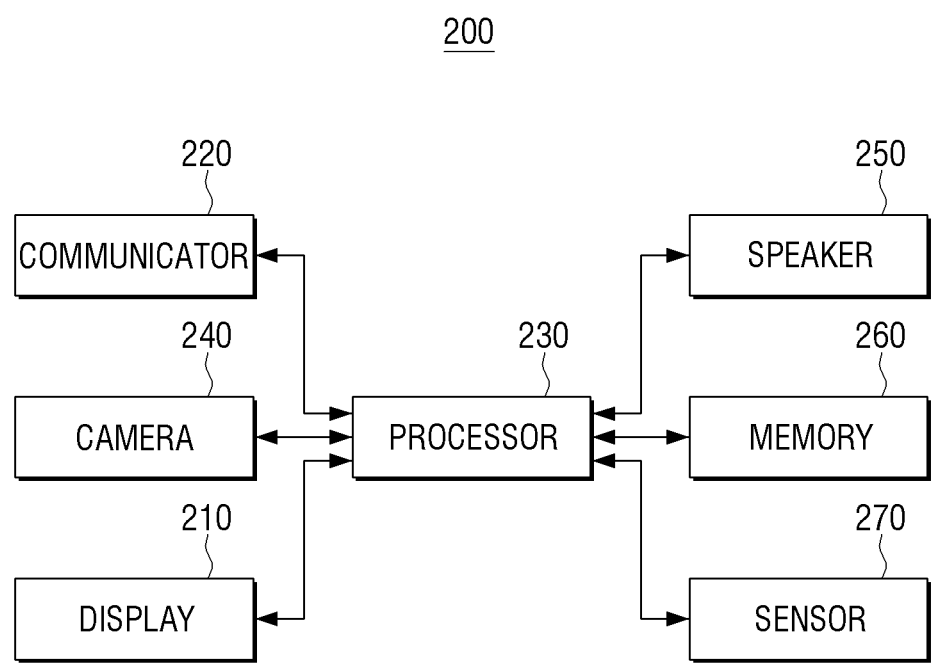
Figure 21:
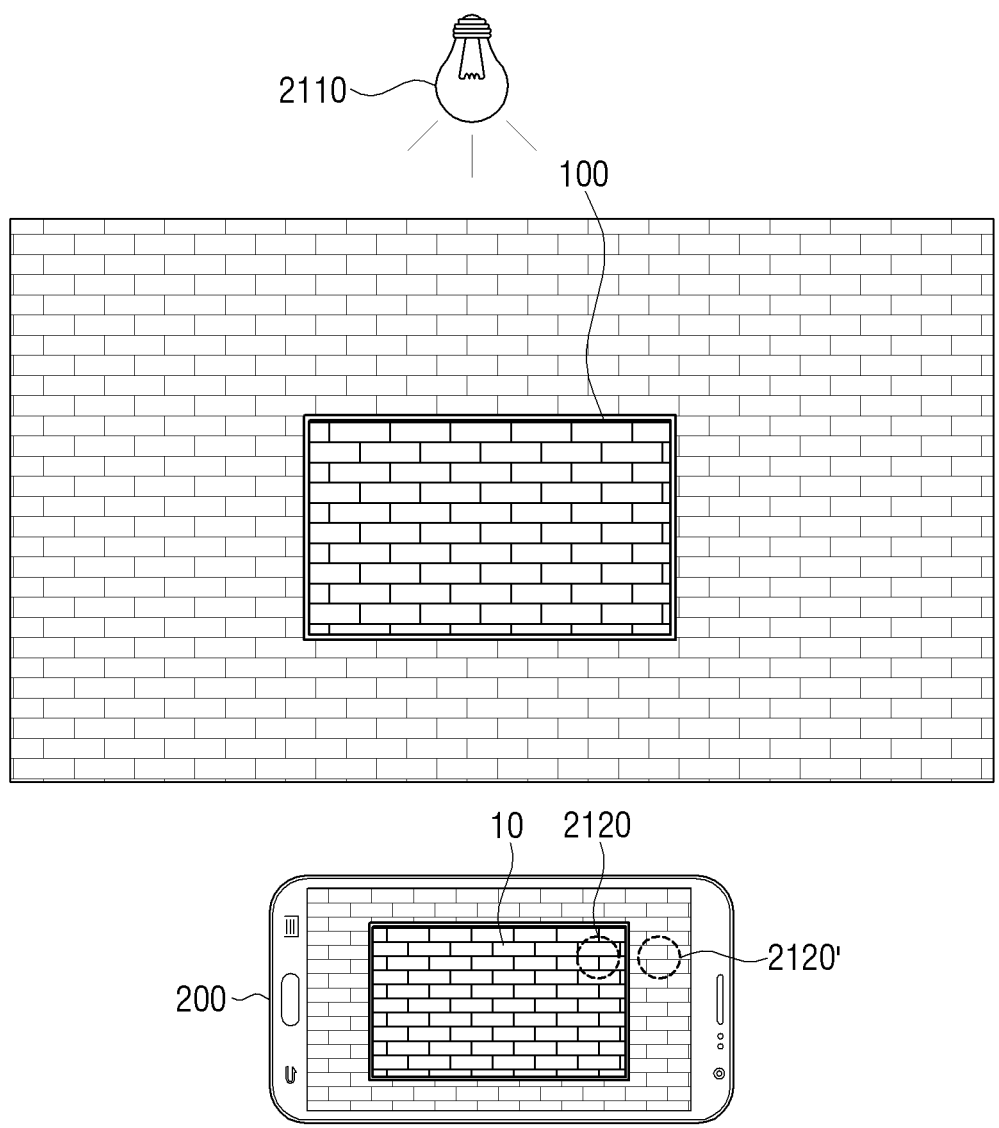
Figure 22:
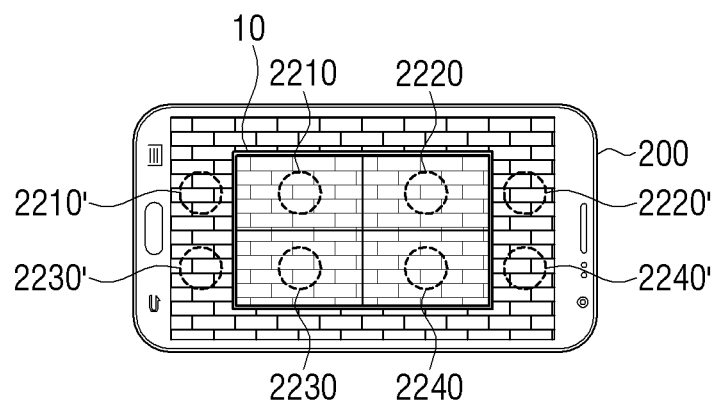
Figure 23A:
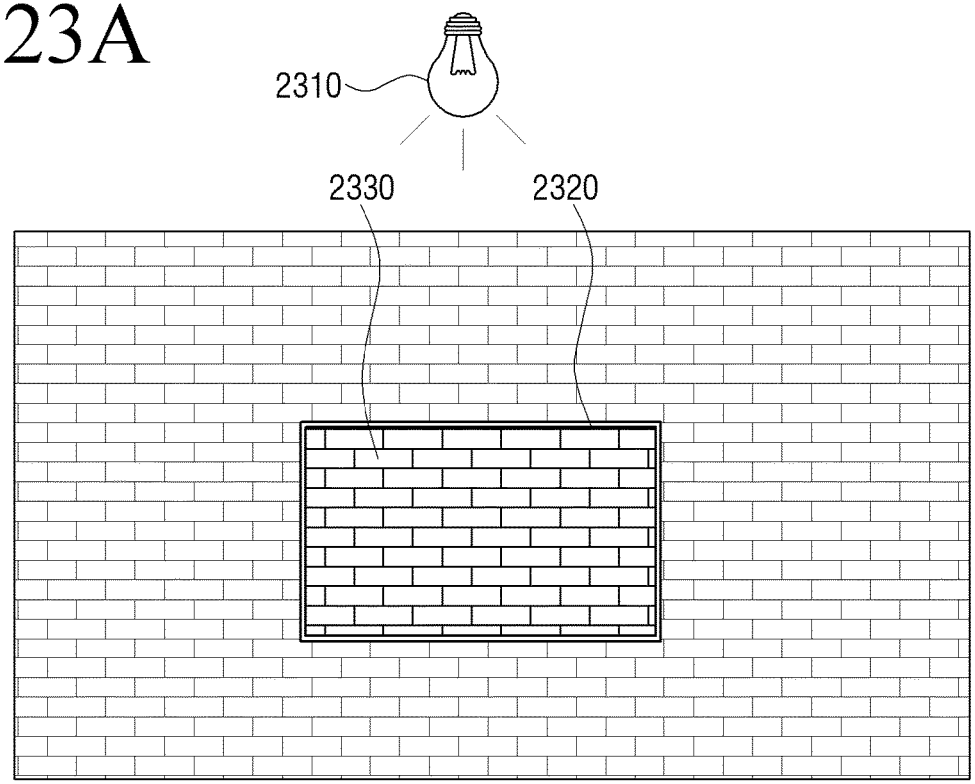
Figure 23B:
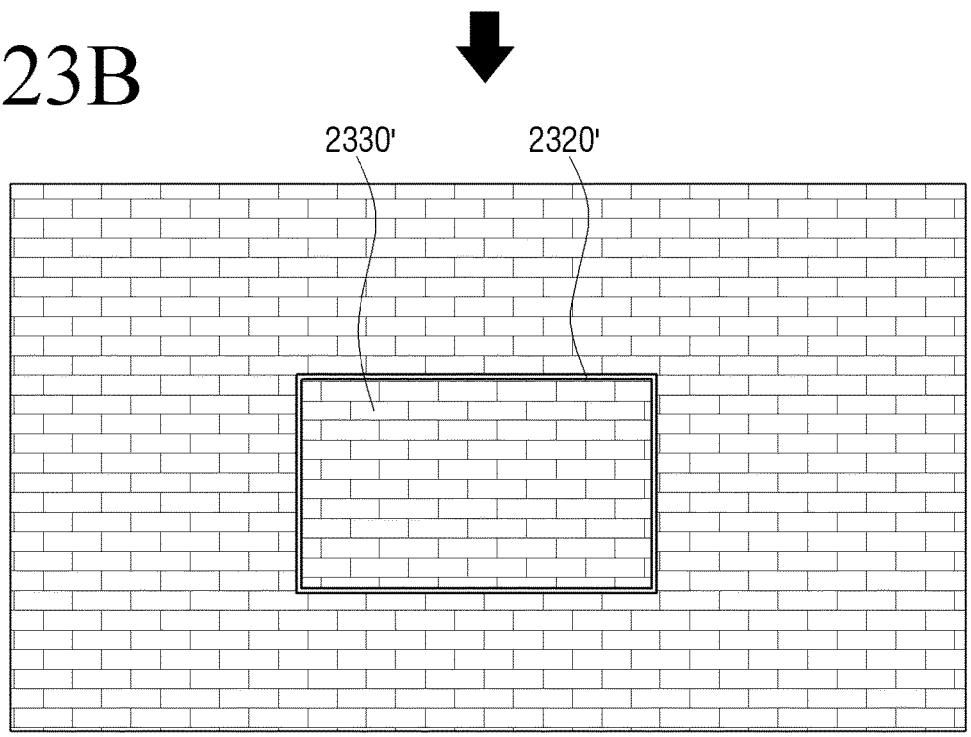
Figure 24:
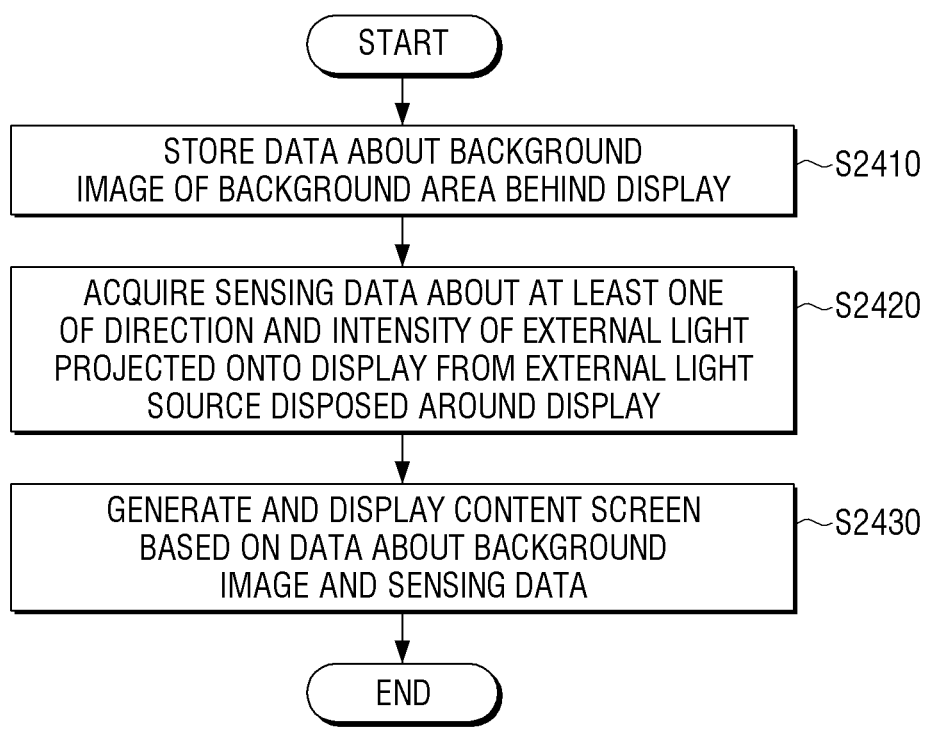
Figure 25:
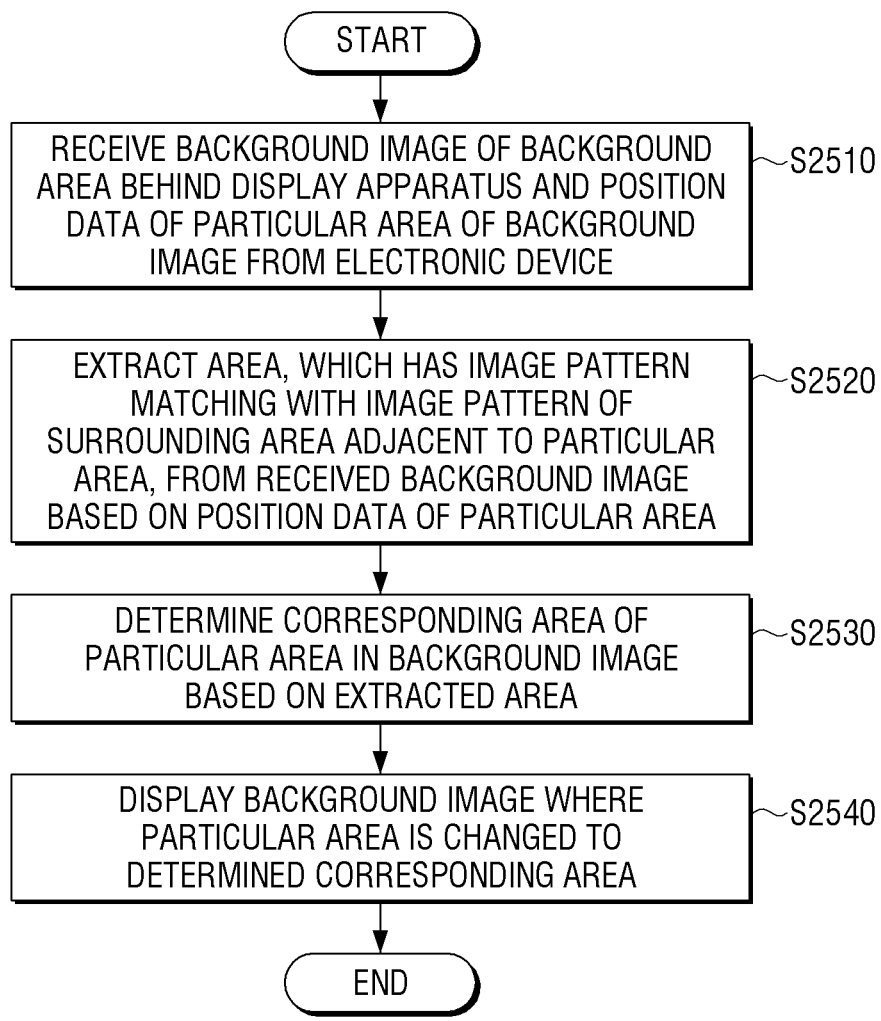
Figure 26:
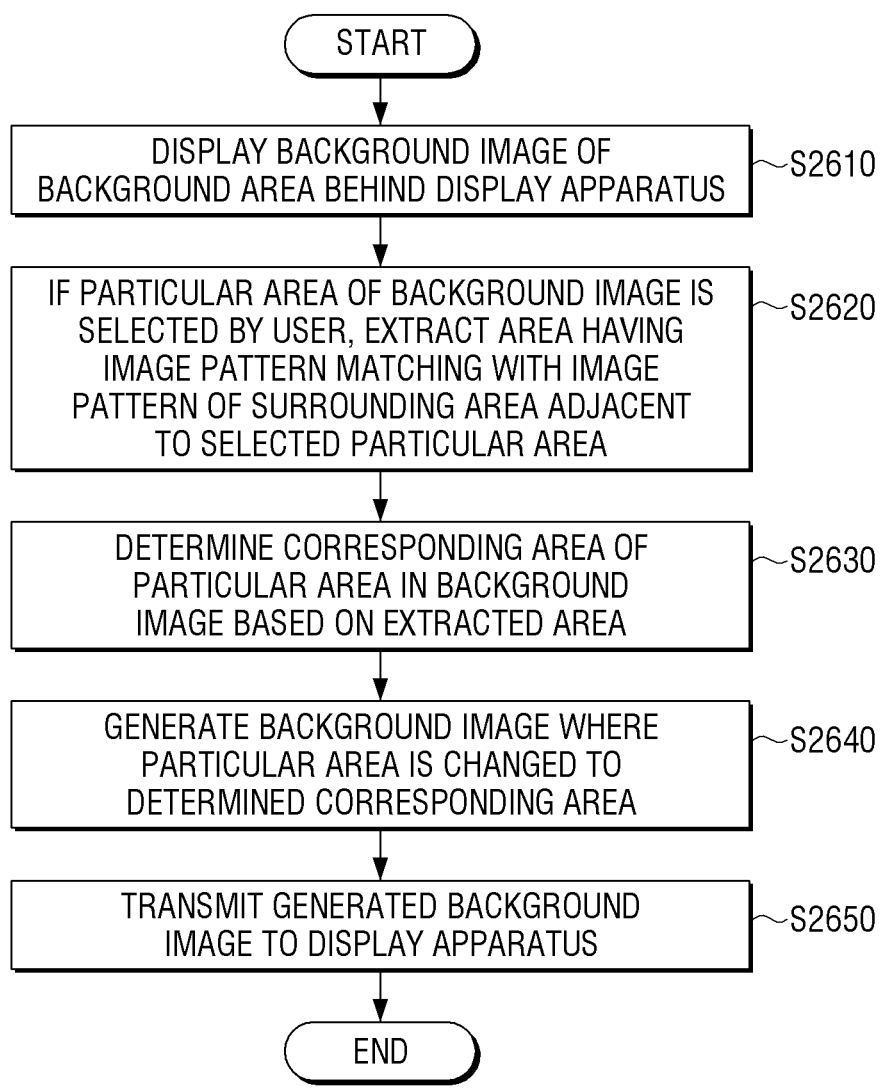
Figure 27:
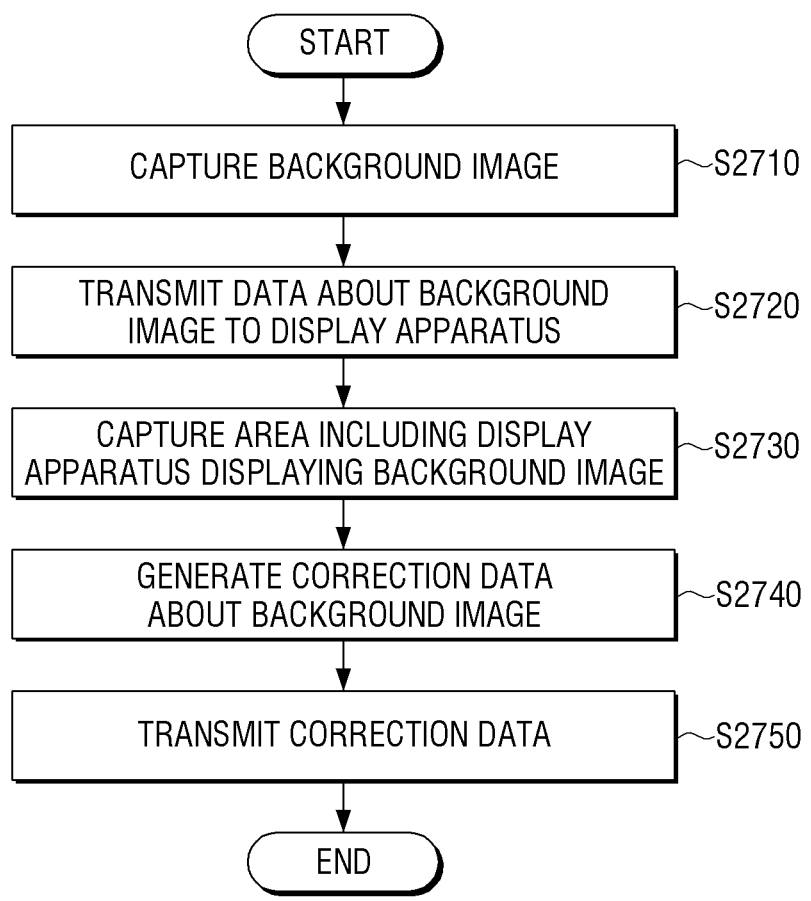
Figure 28:
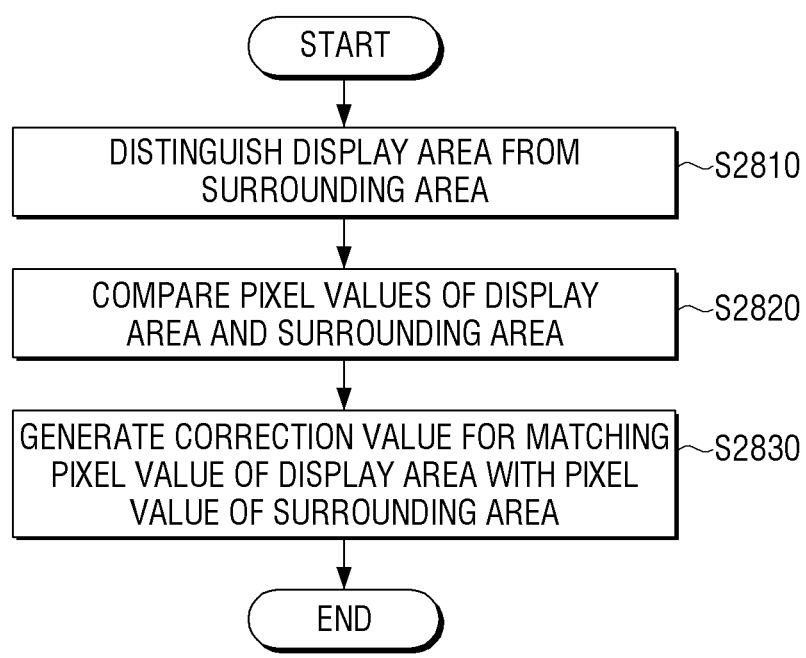

FIGS. 5, 6A through 6C, 7A through 7B, 8A through 8B, and 9A through 9B illustrate content screens that are adaptively changed according to external light, according to various exemplary embodiments;

FIG. 10 illustrates displaying a defect area, which exists behind a display apparatus, on the display apparatus according to an exemplary embodiment;

FIG. 11 illustrates displaying a background image of a background area behind a display apparatus in an electronic device, according to an exemplary embodiment;

FIG. 12 illustrates selecting a particular area and a surrounding area thereof in an electronic device, according to an exemplary embodiment;

FIG. 13 illustrates, in detail, a surrounding area used to determine a corresponding area of a particular area, according to an exemplary embodiment;

FIG. 14 illustrates displaying a corresponding area determined from a particular area on a display apparatus, according to an exemplary embodiment;

FIG. 15 illustrates displaying a screen, where a particular area is changed to a determined corresponding area, on a display apparatus, according to an exemplary embodiment;

FIG. 16 illustrates a method of applying a blending effect in a display apparatus, according to an exemplary embodiment;

FIG. 17 is a block diagram of an electronic device according to an exemplary embodiment;

FIG. 18 is a detailed block diagram of an electronic device according to an exemplary embodiment;

FIG. 19 illustrates distinguishing a background area displayed in a background image in an electronic device, according to an exemplary embodiment;

FIG. 20 illustrates distinguishing a background area displayed in a background image in an electronic device, according to another exemplary embodiment;

FIG. 21 illustrates correcting a background image in an electronic device, according to an exemplary embodiment;

FIG. 22 illustrates correcting a background image in an electronic device, according to another exemplary embodiment;

FIGS. 23A and 23B illustrate displaying a corrected background image in a display apparatus, according to an exemplary embodiment;

FIGS. 24 and 25 are flowcharts of methods of controlling a display apparatus, according to an exemplary embodiment; and FIGS. 26 through 28 are flowcharts of a method of controlling an electronic device, according to exemplary embodiments.

DETAILED DESCRIPTION

Certain exemplary embodiments will now be described in greater detail with reference to the accompanying drawings.

In the following description, same drawing reference numerals are generally used for the same elements even in different drawings. The matters defined in the description, such as detailed construction and elements, are provided to assist in a comprehensive understanding. Thus, it is apparent that exemplary embodiments can be carried out without those specifically defined matters. Also, well-known functions or constructions are not described in detail because they may obscure exemplary embodiments with unnecessary detail.

Exemplary embodiments may have various modifications and may have several types of exemplary embodiments. Therefore, particular exemplary embodiments will be illustrated in the drawings and will be described in detail in the detailed description. However, this is not intended to limit the scope of a particular exemplary embodiment and may be understood as including all changes, equivalents, and alternatives which belong to the spirit and scope of the present invention. Detailed descriptions of exemplary embodiments will be omitted if detailed descriptions of related well-known technologies are determined as making the main point obscure.

Although the terms 'first', 'second', etc. may be used herein to describe various elements regardless of order and/or importance, these elements may not be limited by these terms. These terms are merely used to distinguish one element from another.

The terms used herein are used to describe merely particular exemplary embodiments and are not intended to limit the scope of the disclosure. The singular expression also includes the plural meaning as long as the meaning is not different in context. In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In exemplary embodiments, a "module" or a "part" performs at least one function or operation, and may be implemented with hardware, software, or a combination thereof. In addition, a plurality of "modules" or a plurality of "parts" may be integrated into at least one module, except for a "module" or a "part" which has to be implemented as particular hardware so as to be implemented as at least one processor (not shown).

Hereinafter, exemplary embodiments will be described in detail with reference to the attached drawings.

FIG. 1 is a system diagram for providing a background image according to an exemplary embodiment.

As shown in FIG. 1, a system for providing a background image includes a display apparatus 100 and an electronic device 200.

The display apparatus 100 may be a smart television (TV), a digital TV, a desktop personal computer (PC), a kiosk PC, a large screen video display apparatus, or the like.

The electronic device 200 may be a portable terminal device such as a smartphone. However, exemplary embodiments are not limited thereto, and thus the electronic device 200 may capture an image and may include various types of electronic devices that may perform data communications with the display apparatus 100.

The display apparatus 100 is installed in a particular position, for example a main wall of a building, or a wall or an art wall inside a home, and displays an image received from the electronic device 200 on a screen by performing a data communication with the electronic device 200. In particular, the display apparatus 100 may receive a background image 10 of a wall, where the display apparatus 100 is installed, from the electronic device 200 and display the received background image 10 on the screen. In other words, the display apparatus 100, installed on the wall, may provide a user with a visual effect of a transparent display such as a window by displaying the background image 10 corresponding to the wall.

The display apparatus 100 has two operation modes. A first operation mode, for example a normal mode, is a mode for displaying a normal image. In exemplary embodiments, the first operation mode is a mode for displaying a content pre-stored in the display apparatus 100, or a broadcast received from an external source by using a whole screen of the display apparatus 100.

A second operation mode, for example a background mode, is a mode in which the display apparatus 100 provides a visual effect in which the display apparatus 100 appears as a window, by displaying a content screen including a background image of a background area behind the display apparatus 100. Here, the content screen may include a background image of a background where the display apparatus 100 is positioned, and may include at least one object and a shadow of the at least one object.

If the content screen is displayed in the second operation mode, the display apparatus 100 may display an image of a background area behind the display apparatus 100 as a background image. Therefore, the user may feel as if the display apparatus 100 appears as a transparent window.

In the second operation mode, a background screen may be displayed alone, or the background screen may be displayed together with a particular graphic object. Here, the particular graphic object may be a watch object or a clock object, but may be various types of graphic objects, for example a picture, a photo, a fishbowl, a memo, and the like, that may be attached onto a wall.

If the display apparatus 100 operates in the second operation mode, i.e., if the content screen including the background image is displayed, a difference such as a brightness difference may be small between a real background area and the background image displayed on the display apparatus 100. Accordingly, the user may not recognize a difference between the display apparatus 100 and the real background area.

Therefore, the content screen including the background image displayed on the display apparatus 100 may be adaptively changed according to a change in a surrounding environment of the display apparatus 100.

In exemplary embodiments, the display apparatus 100 according to the present exemplary embodiment senses a surrounding illumination environment and processes and displays a content screen displayed on the display apparatus 100 according to the sensed surrounding illumination environment.

Exemplary embodiments of the above-described operation will be described below in detail by using detailed elements of the display apparatus 100.

Figure 2:
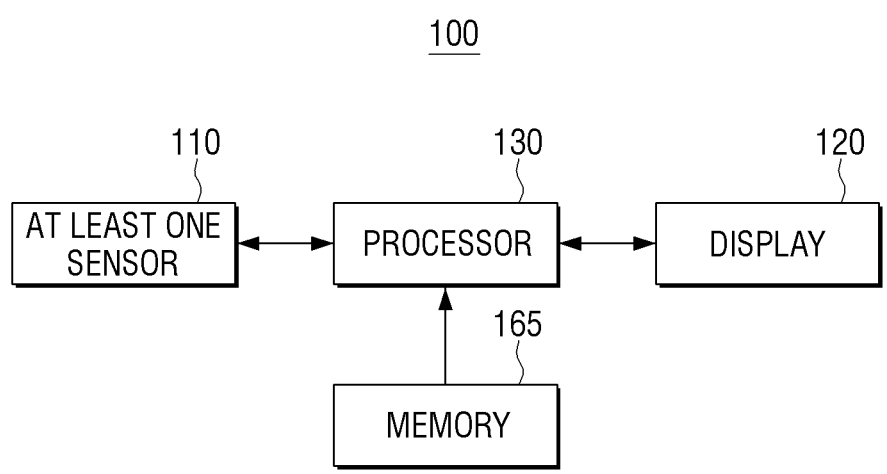
FIG. 2 is a block diagram of a configuration of a display apparatus according to an exemplary embodiment.

FIG. 2 is a block diagram of a configuration of the display apparatus 100, according to an exemplary embodiment.

As shown in FIG. 2, the display apparatus 100 includes at least one sensor 110, a display 120, a memory 165, and a processor 130.

The at least one sensor 110 acquires sensing data for sensing a direction and an intensity of external light projected from an external light source. Here, the at least one sensor 110 may be an illuminance sensor, but this is merely an exemplary embodiment. Therefore, the at least one sensor 110 may further include other types of sensors, for example, a color sensor, a camera, and the like.

In exemplary embodiments, the at least one sensor 110 includes a plurality of sensors that are disposed in separated positions in the display apparatus 100. The at least one sensor 110 may include two sensors, or may include four or more sensors. The at least one sensor 110 described above may be an illuminance sensor capable of sensing an illuminance, a color sensor capable of sensing an illuminance, a color temperature, or the like, a camera capable of capturing an image, or the like.

Also, the at least one sensor 110 may have a shape that is embedded in an outer frame of the display 120 in such a way that the at least one sensor 110 is not affected by light emitted from the display 120. If the at least one sensor 110 includes, for example, two sensors, the at least one sensor 110 may include one illuminance sensor and one color sensor, or may include two illuminance sensors, or two color sensors.

The at least one sensor 110 may further include various types of sensors such as an infrared (IR) sensor, an ultrasonic sensor, a radio frequency (RF) sensor, and the like. The at least one sensor 110 may also sense a position of an external user or object through various types of sensors.

The display 120 displays image data. In particular, while the display apparatus 100 operates in the first operation mode, the display 120 may display an image content acquired from an external source for example a broadcasting station, a server, a Digital Versatile Disk (DVD), or the like. Also, while the display apparatus 100 operates in the second operation mode, the display 120 may display a content screen including a pre-stored background image. Here, the content screen may include at least one graphic object and a shadow of the at least one graphic object on a background image.

The display 120 may be various types of displays such as a Liquid Crystal Display (LCD), a Plasma Display Panel (PDP), and the like. The display 120 may include a driver circuit, which may be of a type such as an Amorphous Silicon (a-Si) Thin Film Transistor (TFT), a Low Temperature Poly Silicon (LTPS) TFT, an organic TFT (OTFT), or the like, a backlight unit, and the like. The display 120 may be combined with a touch sensor as a touch screen.

The display 120 includes backlight. Here, the backlight is a point light source including a plurality of light sources and supports local dimming.

Here, the light source constituting the backlight may be constituted as a Cold Cathode Fluorescent Lamp (CCFL) or a Light Emitting Diode (LED). In exemplary embodiments, the backlight may include an LED and an LED driver circuit, and may include other types of elements besides the LED. Also, the plurality of light sources constituting the backlight may be disposed in various forms, and various types of local dimming technologies may be applied to the plurality of light sources. For example, the backlight may be a direct type backlight in which a plurality of light sources are disposed in a matrix form to be uniformly disposed on a whole screen of an LCD. In this case, the backlight may operate under Full-Array local dimming or Direct local dimming. Here, the Full-Array local dimming may be a dimming type where light sources are entirely uniformly disposed in back of an LCD screen and luminance of each of the light sources is controlled. The Direct local dimming may be a dimming type that is similar to the Full-Array local dimming type, but includes a smaller number of light sources.

In exemplary embodiments, the backlight may be an edge type backlight in which a plurality of light sources are disposed only at an edge of an LCD. In this case, the backlight may operate under Edge-lit local dimming. Here, the Edge-lit local dimming may include a plurality of light sources that are disposed only at an edge of a panel, only on left and/or right sides, only on upper and/or lower parts, or on any desired combination of left, right, upper, and lower parts.

In exemplary embodiments, the display 120 may display the content screen including the background image. Here, the content screen may include an object layer including at least one graphic object, a shadow layer including a shadow of the at least one graphic object, and a background image layer including a background image.

Also, while the display 120 operates in the first operation mode, the display 120 may be driven in a first frequency, for example 120 Hz or 240 Hz. While the display 120 operates in the second operation mode, the display 120 may be driven in a second frequency, for example 60 Hz, lower than the first frequency. In other words, while the display 120 operates in the second mode, the display 120 may be driven in a low frequency, thereby minimizing power consumption.

The memory 165 stores a program and data for controlling the display apparatus 100. The memory 165 may also store an image content. In particular, the memory 165 may store data about a background image of a background area behind the display apparatus 100. In exemplary embodiments, the data about the background image may be acquired from an electronic device such as a smartphone or from a camera connected to the display apparatus 100.

The processor 130 controls an overall operation of the display apparatus 100. In particular, the processor 130 may generate a content screen based on the data of the background image stored in the memory 165 and the sensing data acquired by the at least one sensor 110 and display the generated content screen on the display 120. Here, the content screen may include at least one graphic object and a shadow corresponding to the at least one graphic object on a background image. In this case, at least one of a position and an appearance of the shadow, such as a shade of the shadow, may be changed in response to a change in sensing data.

In exemplary embodiments, if a bezel and an outer frame covering the bezel are included at an edge of the display apparatus 100, the processor 130 may control the display 120 to further display an outer frame shadow in an area corresponding to the outer frame at an edge of the content screen.

The processor 130 may generate an object layer including at least one graphic object, a shadow layer including a shadow, and a background image layer including a background image in order to generate the content screen. Here, the object layer may be acquired from an external source or may be generated from pre-stored data, the shadow layer may be generated based on the object layer and the sensing data, and the background image layer may be generated from data of a background image stored in the memory 165. According to an exemplary embodiment, a plurality of object layers or a plurality of background image layers may be generated. Also, an outer frame shadow layer including the outer frame shadow may be further generated.

The processor 130 may control the display 120 to sequentially arrange the object layer, the shadow layer, and the background image layer, so that the background image layer, the shadow layer, and the object layer are sequentially displayed from a front position. In addition, if the outer frame shadow layer is generated, the processor 130 may control the display 120 to arrange and display the outer frame shadow layer in front of the object layer.

Also, the processor 130 may perform an image correction with respect to the at least one graphic object included in the content screen according to an intensity of external light sensed by the at least one sensor 110. For example, the processor 130 may control brightness of the at least one graphic object according to the intensity of the external light.

In addition, if the content screen includes a plurality of graphic objects, the processor 130 may perform different image corrections with respect to the plurality of graphic objects according to types of the plurality of graphic objects. For example, the processor 130 may set an amount of brightness for a first type of graphic object, e.g., a watch or the like, and a set a different amount of brightness for a second type of graphic object, e.g., a fishbowl or the like, according to the intensity of the external light.

Also, the processor 130 may perform an image correction with respect to the background image included in the content screen according to at least one of a direction and an intensity of external light sensed by the at least one sensor 110. For example, the processor 130 may control brightness of the background image in order to enable the background image to be darker as the intensity of the external light is dark.

In addition, the processor 130 may generate a shadow based on whether the background image has a pattern. For example, if the background image includes a pattern, the processor 130 may increase brightness of the shadow. If the background image does not include a pattern, the processor 130 may decrease the brightness of the shadow.

Figure 3:
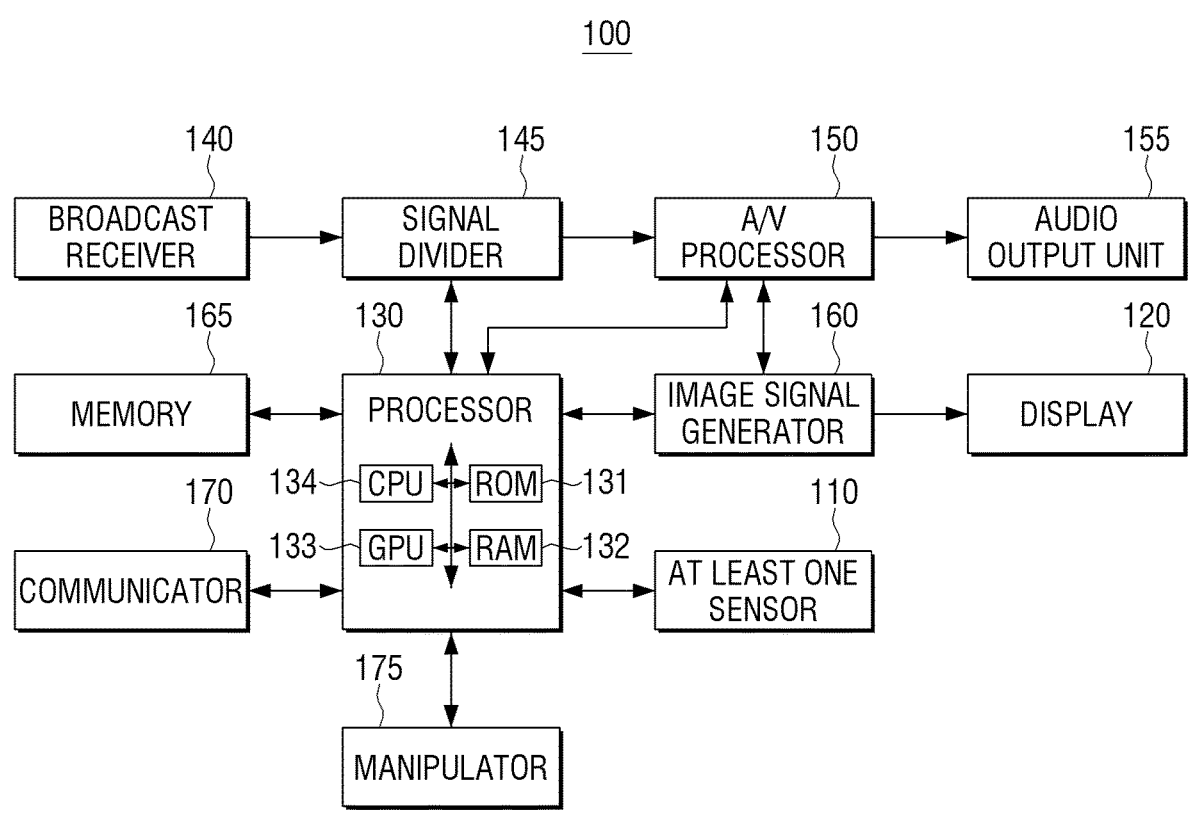
FIG. 3 is a block diagram of a configuration of a display apparatus according to an exemplary embodiment.

FIG. 3 is a block diagram of a detailed configuration of the display apparatus 100, according to an exemplary embodiment.

Referring to FIG. 3, the display apparatus 100 according to an exemplary embodiment may include a broadcast receiver 140, a signal divider 145, an A/V processor 150, an audio output interface 155, an image signal generator 160, a communicator 170, and a input interface 175 in addition to above-described elements.

The broadcast receiver 140 receives a broadcast from a broadcasting station or a satellite, by wire or wirelessly, and demodulates the broadcast. The broadcast receiver 140 may output a digital transmission stream signal by receiving a transmission stream through an antenna or a cable and demodulating the transmission stream.

The signal divider 145 divides a transmission stream signal provided from the broadcast receiver 140 into an image signal, an audio signal, and an additional information signal. The signal divider 145 transmits the image signal and the audio signal to the A/V processor 150.

The A/V processor 150 performs signal processing, such as video decoding, video scaling, audio decoding, and the like, with respect to the image signal and the audio signal input from the broadcast receiver 140 and the memory 165. Also, the A/V processor 150 outputs the image signal to the image signal generator 160 and outputs the audio signal to the audio output interface 155.

If the received image signal and audio signal are stored in the memory 165, the A/V processor 150 may output an image and an audio in compressed formats to the memory 165.

The audio output interface 155 converts the audio signal output from the A/V processor 150 into a sound and outputs the sound through a speaker or outputs the sound to a connected external device through an external output terminal.

The image signal generator 160 generates a Graphic User Interface (GUI) that is provided for a user. The image signal generator 160 also adds the generated GUI to an image output from the A/V processor 150. In addition, the image signal generator 160 provides the display 120 with an image signal corresponding to the image to which the GUI is added. Therefore, the display 120 displays various types of information provided from the display apparatus 100 and the image transmitted from the image signal generator 160.

The image signal generator 160 may also process and output a content screen generated by the processor 130. In detail, the image signal generator 160 may output and provide to the display a plurality of layers as they are, or may synthesize, or merge, the plurality of layers and then provide the synthesized layers to the display.

The memory 165 stores various types of data and programs for controlling the display apparatus 100. The memory 165 may also be provided with an image content, where an image and an audio are compressed, from the A/V processor 150 and store the image content. In particular, the memory 165 may store data about a background image.

The memory 165 may include a hard disk, a nonvolatile memory, a volatile memory, or the like.

The input interface 175 may be a touch screen, a touch pad, a key button, a keypad, or the like to allow a user manipulation of the display apparatus 100. In tan exemplary embodiment, a control command may be input through the input interface 175 of the display apparatus 100, or the input interface 175 may receive a user manipulation from an external control device, for example a remote controller.

The communicator 170 is an element that communicates with various types of external devices according to various types of communication methods. The communicator 170 may include a wireless fidelity (WiFi) chip and a Bluetooth chip. The processor 130 may communicate with various types of external devices by using the communicator 170. For example, the communicator 170 may receive a control command from a control terminal device, for example a smartphone, a remote controller, or the like, capable of controlling the display apparatus 100.

The communicator 170 may acquire weather information through a communication with an external server.

In exemplary embodiments, the communicator 170 may further include various types of external input ports for being connected to various types of external terminals such as a Universal Serial Bus (USB) port to which a USB connector may be connected, a headset, a mouse, a Local Area Network (LAN), and the like, a Digital Multimedia Broadcasting (DMB) chip for receiving and processing a DMB signal, and the like.

The processor 130 controls an overall operation of the display apparatus 100. For example, the processor 130 may control the image signal generator 160 and the display 120 to display an image according to a control command input through the input interface 175 in the first operation mode.

The processor 130 may include a Read Only Memory (ROM) 131, a Random Access Memory (RAM) 132, a Graphic Processing Unit (GPU) 133, a Central Processing Unit (CPU) 134, and a bus. The ROM 131, the RAM 132, the GPU 133, the CPU 134, and the like may be connected to one another through the bus.

The CPU 134 performs booting by using an Operating System (O/S) stored in the memory 165 by accessing the memory 165. The CPU 134 may also perform various operations by using various types of programs, contents, data, and the like stored in the memory 165. An operation of the CPU 134 is the same as an operation of the processor 130 of FIG. 2, and thus a repeated description thereof is omitted.

The ROM 131 stores a command set and the like for booting a system. If power is supplied by inputting a turn-on command, the CPU 134 boots the system by copying the O/S stored in the memory 165 into the RAM 132 and executing the O/S according to a command stored in the ROM 131. When the system is booted, the CPU 134 performs various types of operations by copying various types of programs stored in the memory 165 into the RAM 132 and executing the programs copied into the RAM 132.

When the display apparatus 100 is booted, the GPU 133 may generate a screen including various types of objects including an icon, an image, a text, and the like. In detail, if the display apparatus 100 operates in the second operation mode, the GPU 133 may generate a content screen including a graphic object and a shadow of the graphic object on a background image.

The GPU 133 may be constituted as an additional element such as the image signal generator 160, or may include an element such as a System on Chip (SoC) combined with the CPU 134 of the processor 130.

In exemplary embodiments, while the display apparatus 100 operates in the second operation mode, the processor 130 may control to generate and display a content screen on the display 120 based on the data of the background image stored in the memory 165 and the sensing data acquired by the at least one sensor 110. Here, the content screen may include at least one graphic object and a shadow corresponding to the at least one graphic object on the background image. In this case, at least one of a position and an appearance of the shadow, for example a shade of the shadow, may be changed in response to a change in the sensing data.

Exemplary embodiments of operations of the processor 130 will be described in more detail below with reference to the drawings.

First, the display apparatus 100 may receive data about a background image from an external portable terminal and store the data in the memory 165.

In particular, the display apparatus 100 may receive data of a background image, which is acquired by using a guide member before the display apparatus 100 is installed, from an electronic device such as a smartphone.

In detail, the user may fix the guide member in a place at which the display apparatus 100 is to be installed, for example on a wall.

If the guide member is fixed, the electronic device may acquire an image including the guide member, which is positioned in an area where the display apparatus 100 is to be installed, by using a camera. Also, the portable terminal may display the acquired image. Here, the displayed image may include a plurality of indicators that guide a position of a mark of the guide member for acquiring an optimum background image.

Also, the electronic device may acquire data about a background image of a position where the display apparatus 100 is installed, by analyzing a background of an area, for example a wall area, where the display apparatus 100 is positioned in the guide member of a captured image. Here, the background image refers to an image of an area where the display apparatus 100 is installed, for example a wall, and if the background image is displayed on the display apparatus 100, the user may be provided with a window effect through the display apparatus 100.

Also, the electronic device may transmit information about the background image to the display apparatus 100.

Figure 4A:
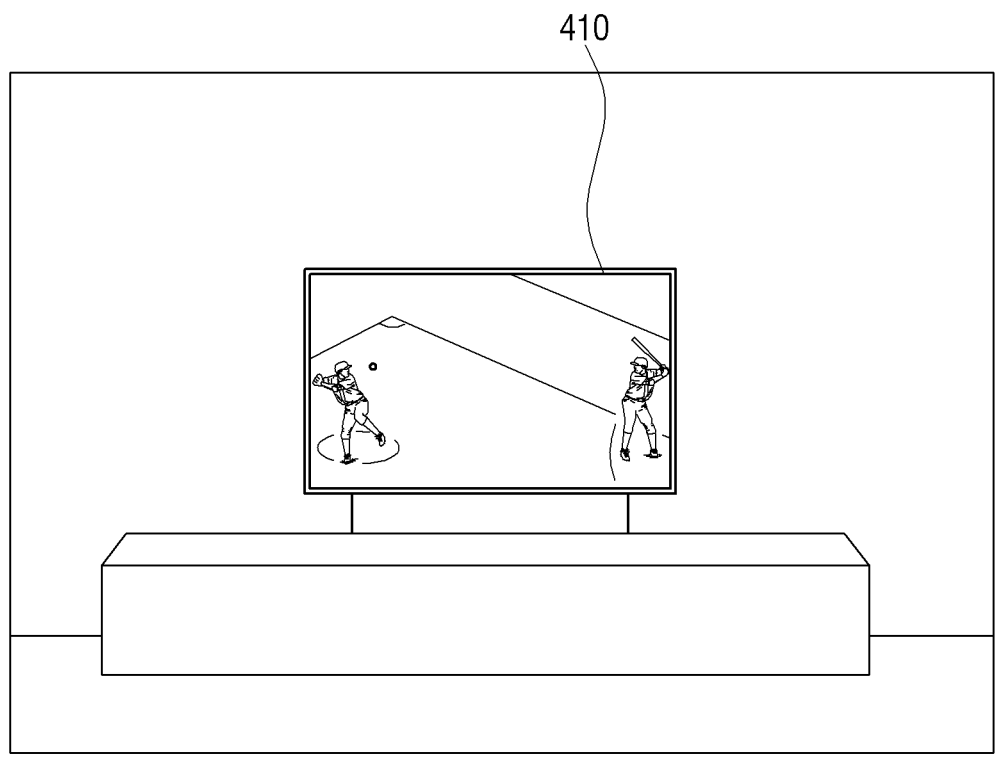
FIGS. 4A and 4B illustrate a normal mode and a background mode of a display apparatus, according to an exemplary embodiment.

In addition, while the display apparatus 100 operates in the first operation mode, for example a normal mode, the processor 130 may control the display 120 to display an image content received from an external source or a pre-stored image content. For example, as shown in FIG. 4A, the processor 130 may control the display 120 to display a broadcast content 410 received through a tuner.

While the display apparatus 100 operates in the normal mode, a preset user command is input, for example a command selecting a particular button of a remote controller, or a preset event is detected, for example an event in which the display apparatus 100 senses the user in a standby mode, for example in a state where the display 120 is turned off, the processor 130 may change an operation mode of the display apparatus 100 from the first operation mode to the second operation mode, or a background mode.

Figure 4B:
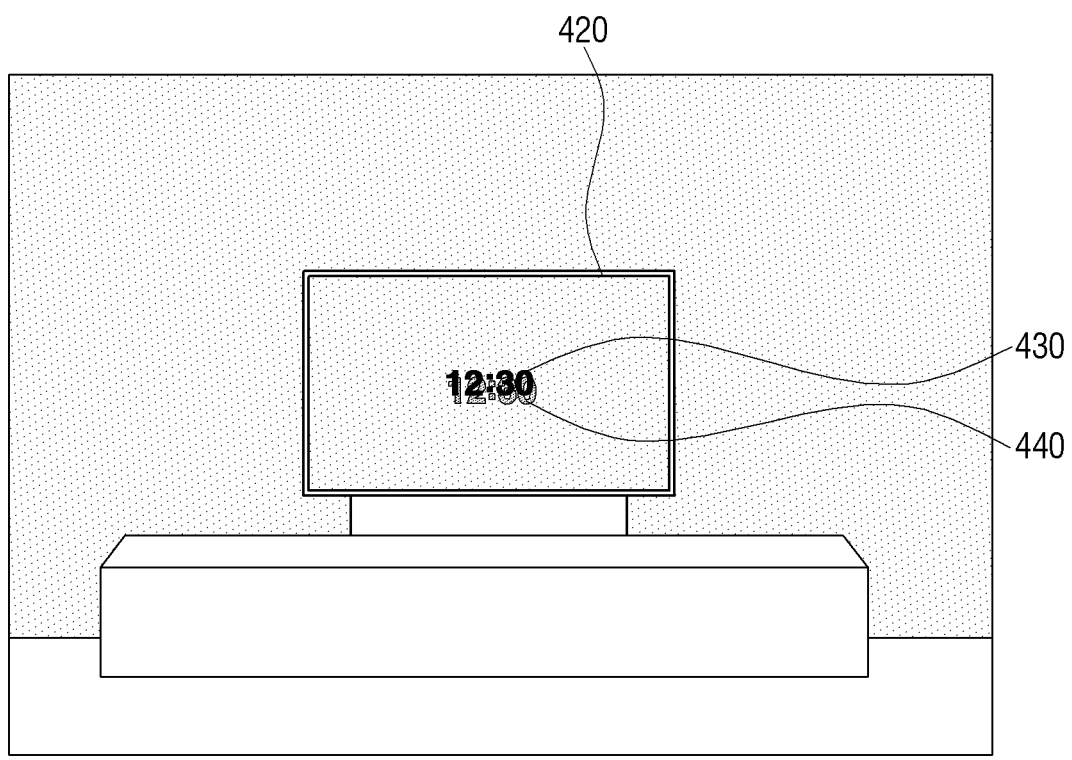

While the display apparatus 100 operates in the second operation mode, the processor 130 may control the display 120 to display a content screen including a background image based on pre-stored data about the background image and sensing data acquired by the at least one sensor 110. Here, as shown in FIG. 4B, the content screen may include a clock object 430 and a shadow 440 corresponding to the clock object 430 on a background image 420.

Here, a position and a shade of the shadow 440 may be changed in response to a change in the sensing data. In detail, the position and the shade of the shadow 440 may be controlled based on a direction and an intensity of external light.

Figure 5:
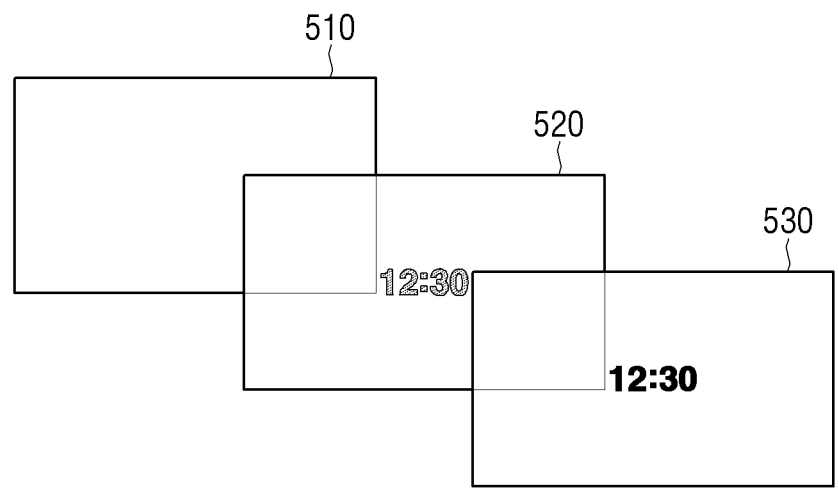

In the exemplary embodiment shown in FIG. 5, the processor 130 may generate a background image layer 510 including the background image 420 based on information about the background image 420. The processor 130 may also generate an object layer 530 including the clock object 430 and a shadow layer 520 including the shadow 440 of the clock object 430. In addition, as shown in FIG. 5, the processor 130 may control the display 120 to sequentially display the background image layer 510, the shadow layer 520, and the object layer 530, so that the object layer 530 is displayed in a foremost or front position, the shadow layer 520 is displayed in a middle position, and the background image layer 510 is displayed in a backmost or back position.

In the exemplary embodiment shown in FIG. 5, one object layer 530 and one shadow layer 520 are described. In other exemplary embodiments, a plurality of object layers and a plurality of shadow layers may be generated. For example, the processor 130 may generate an object layer including a clock object, an object layer including a vine object, and shadow layers respectively corresponding to the clock object and the vine object. If a plurality of object layers are generated, the processor 130 may control the display 120 to arrange and display an object layer including an object, which is to appear further ahead, or in front. For example, if an object layer including a clock object and an object layer including a vine object are generated, the processor 130 may control the display 120 to arrange and display the object layer including the clock object ahead or in front of the object layer including the vine object.

Figure 6A:
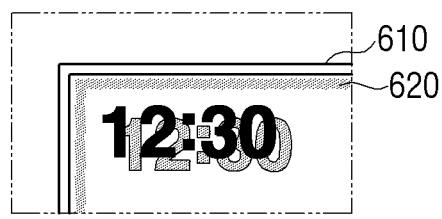

In an exemplary embodiment shown in FIG. 6A, the display apparatus 100 may further include a bezel disposed at an edge of the display 120 and an outer frame 610 covering the bezel. Here, the processor 130 may further generate an outer frame shadow layer of a shadow 620 of the outer frame 610 and may control the display 120 to display a content screen including the shadow 620 of the outer frame 610 as shown in FIG. 6A.

Figure 6B:
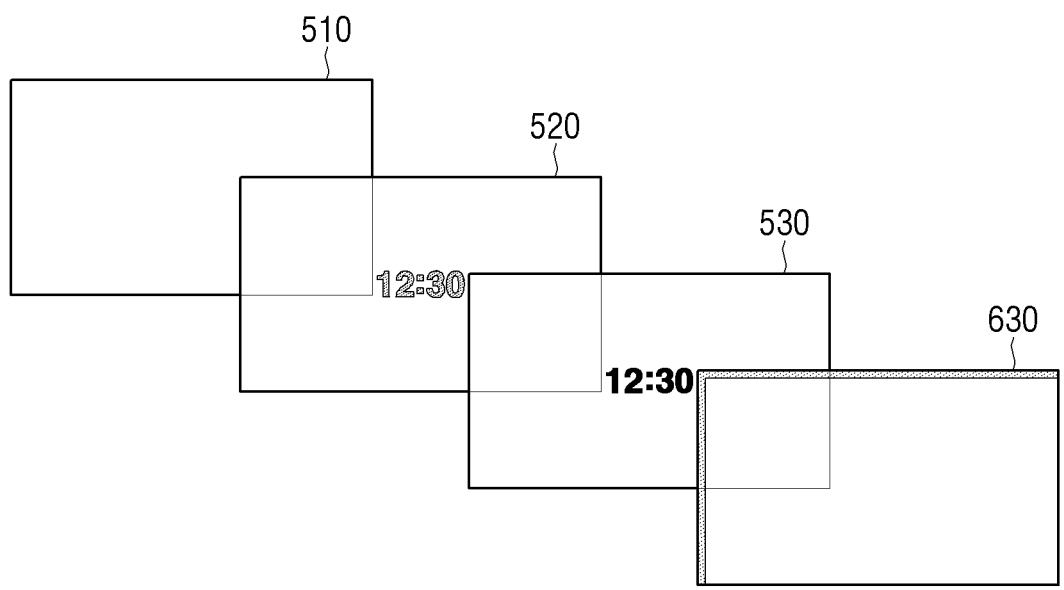

Here, as shown in FIG. 6B, the processor 130 may control the display 120 to sequentially arrange the background image layer 510, the shadow layer 520, the object layer 530, and an outer frame shadow layer 630, so that the outer frame shadow layer 630, the object layer 530, the shadow layer 520, and the background image layer 510 are sequentially displayed from a front position. In other words, as shown in FIG. 6B, if the outer frame shadow layer 630 is arranged in a foremost position, and the shadow 620 of the outer frame 610 overlaps with a graphic object, the shadow 620 of the outer frame 610 may be seen as being ahead of the graphic object, thereby providing a realistic window effect.

Figure 6C:
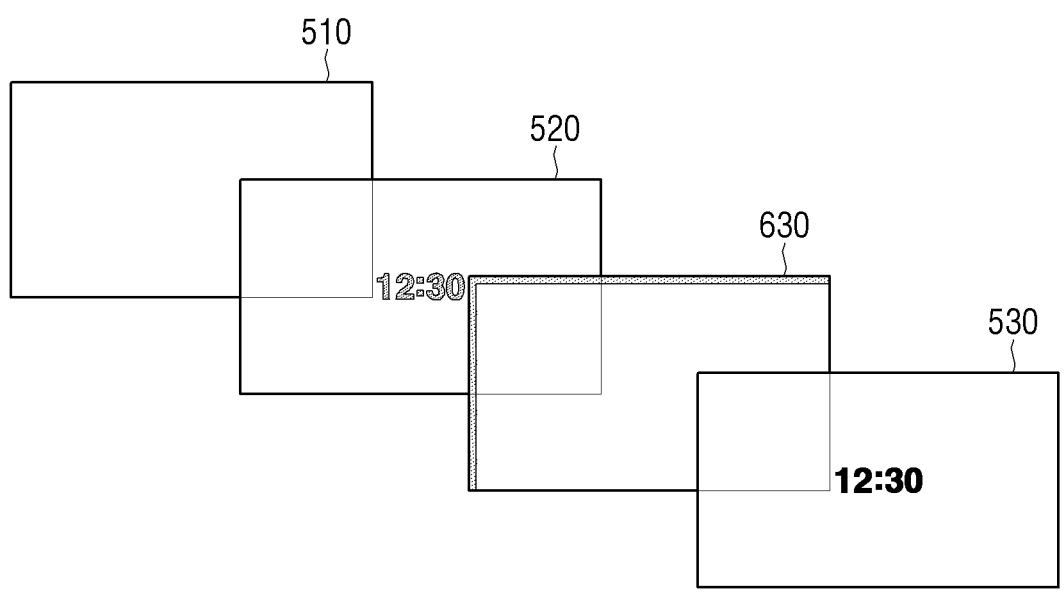

According to another exemplary embodiment, as shown in FIG. 6C, the processor 130 may control the display 120 to arrange the background image layer 510, the shadow layer 520, the outer frame shadow layer 630, and the object layer 530, so that the object layer 530, the outer frame shadow layer 630, the shadow layer 520, and the background image layer 510 are sequentially displayed from a front position.

The processor 130 may also perform image corrections with respect to a background image, a graphic object, and a shadow of the graphic object included in a content screen based on sensing data acquired by the at least one sensor 110.

In detail, the processor 130 may generate a shadow of a graphic object or a shadow of an outer frame included in a content screen based on a direction of external light acquired by the at least one sensor 110. For example, a direction of the shadow of the graphic object or the shadow of the outer frame included in the content screen may be changed according to a change in a direction of sunlight acquired by the at least one sensor 110.

Also, the processor 130 may control a brightness of a background image, a brightness of a graphic object, and a brightness of a shadow of the graphic object included in a content screen based on an intensity of external light acquired by the at least one sensor 110.

Figure 7A:
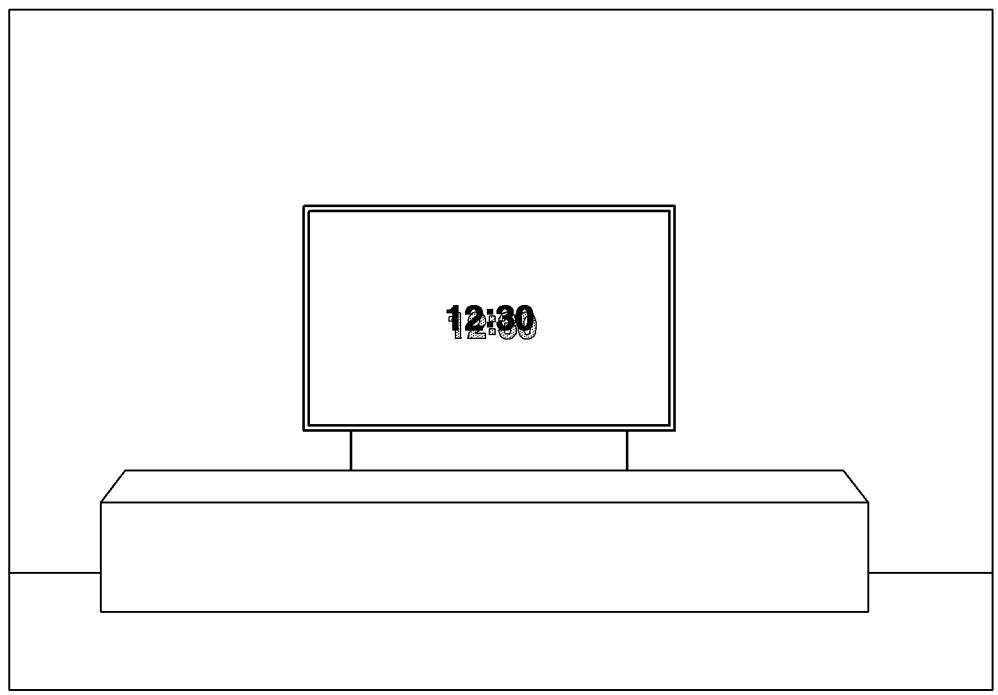

According to an exemplary embodiment, if it is sensed that an intensity of external light becomes higher based on sensing data acquired by the at least one sensor 110, as shown in FIG. 7A, the processor 130 may generate the background image layer 510 in order to enable a contrast of a background image to further brighten, generate the object layer 530 in order to enable a contrast of a graphic object to further darken, and generate the object layer 530 and the outer frame shadow layer 630 in order to enable a contrast of the graphic object or a contrast of a shadow of an outer frame to brighten.

Figure 7B:
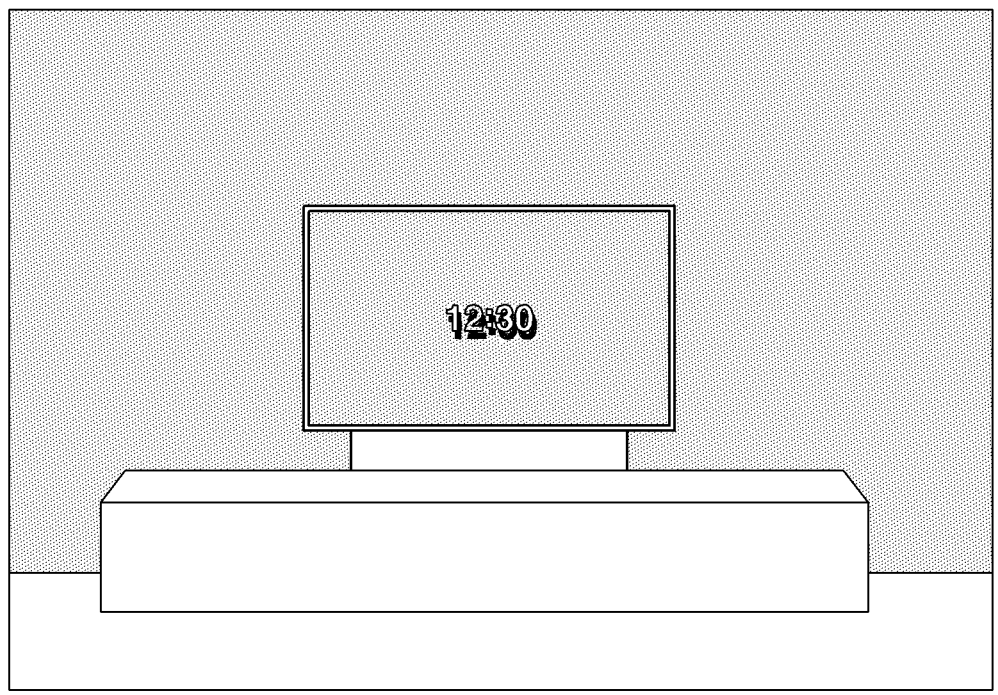

Also, if it is sensed that the intensity of the external light is lowered based on the sensing data acquired by the at least one sensor 110, as shown in FIG. 7B, the processor 130 may generate the background image layer 510 in order to enable the contrast of the background image to further darken, generate the object layer 530 in order to enable the contrast of the graphic object to further brighten, and generate the object layer 530 and the outer frame shadow layer 630 in order to enable the contrast of the graphic object and the contrast of the shadow of the outer frame to darken.

In other words, as shown in FIGS. 7A and 7B, the user may not perceive a difference between a real background area and a background image of the display apparatus 100 by controlling a contrast of a background image of a content screen according to an intensity of external light. Also, the user may further clearly perceive the graphic object regardless of brightness of the external light by controlling the contrast of the graphic object according to the intensity of the external light. In addition, the user may be provided with an image effect in which the graphic object appears to float on a window, by controlling the contrast of the graphic object or the shadow of the outer frame according to the intensity of the external light.

Moreover, if a content screen includes a plurality of graphic objects, the processor 130 may perform different image corrections with respect to the plurality of graphic objects according to types of the plurality of graphic objects.

Figure 8A:
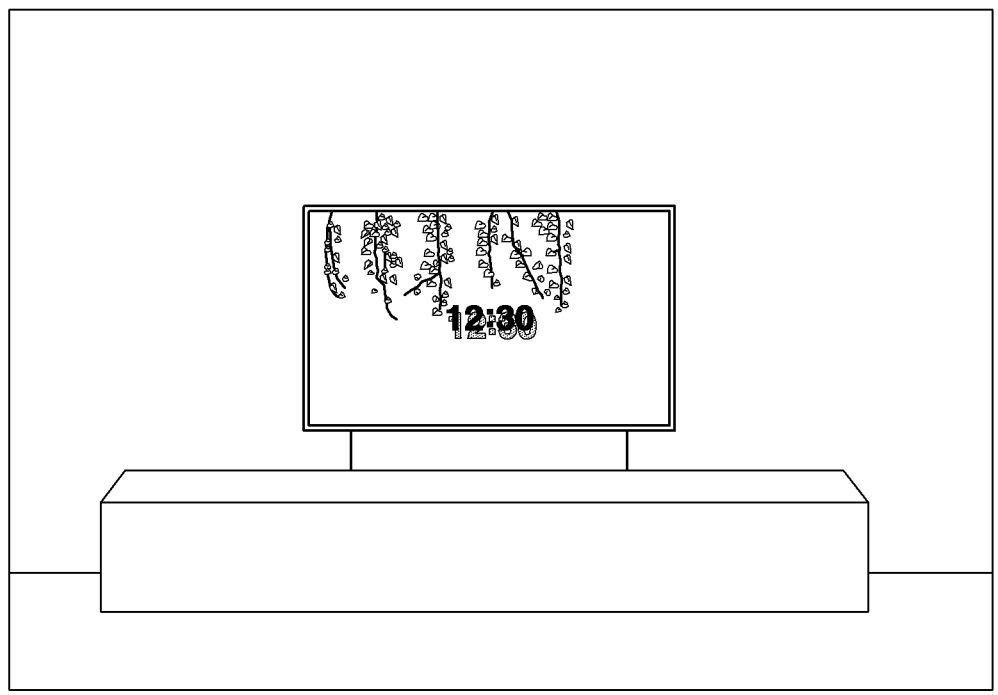
Figure 8B:
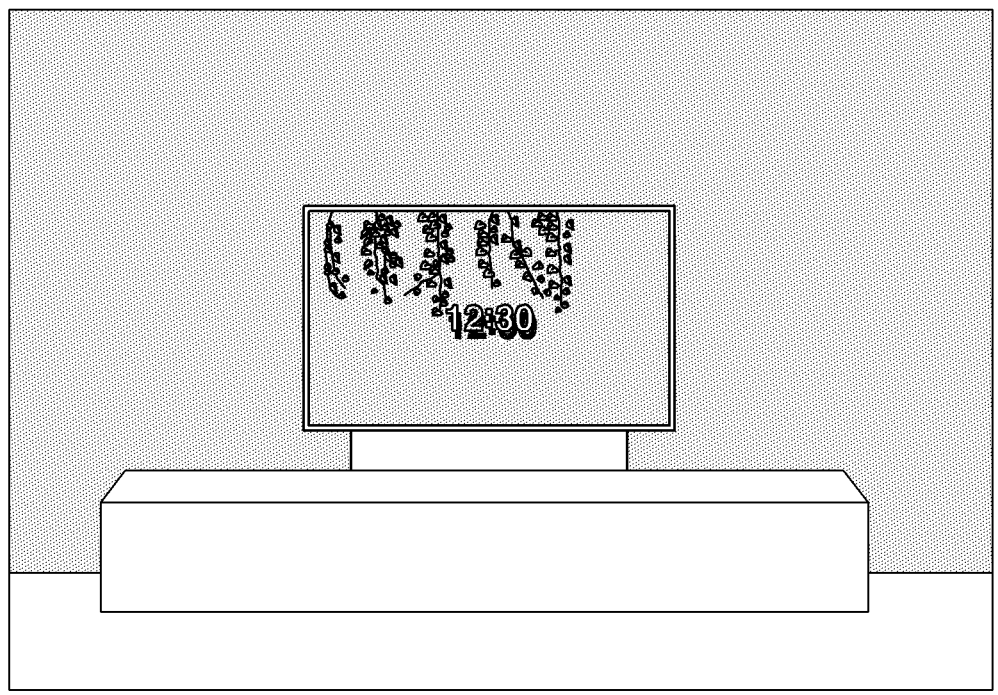

In detail, as shown in FIGS. 8A and 8B, a content screen may include an object, for example a vine object, a fishbowl object, or the like, functioning as a background, and an object, for example a clock object, a memo object, or the like, which provides information.

According to an exemplary embodiment, if it is sensed that an intensity of external light becomes higher based on sensing data acquired by the at least one sensor 110, as shown in FIG. 8A, the processor 130 may generate a first object layer in order to enable a contrast of the vine object to further increase together with a background image and generate a second object layer in order to enable a contrast of the clock object to further darken.

Also, if it is sensed that the intensity of the external light is lowered based on the sensing data acquired by the at least one sensor 110, as shown in FIG. 8B, the processor 130 may generate the first object layer so as to enable the contrast of the vine object to further darken together with the background image and generate the second object layer so as to enable the contrast of the clock object to further brighten.

In addition, the processor 130 may generate a graphic object and a shadow of the graphic object according to whether the background image includes a pattern.

Figure 9A:
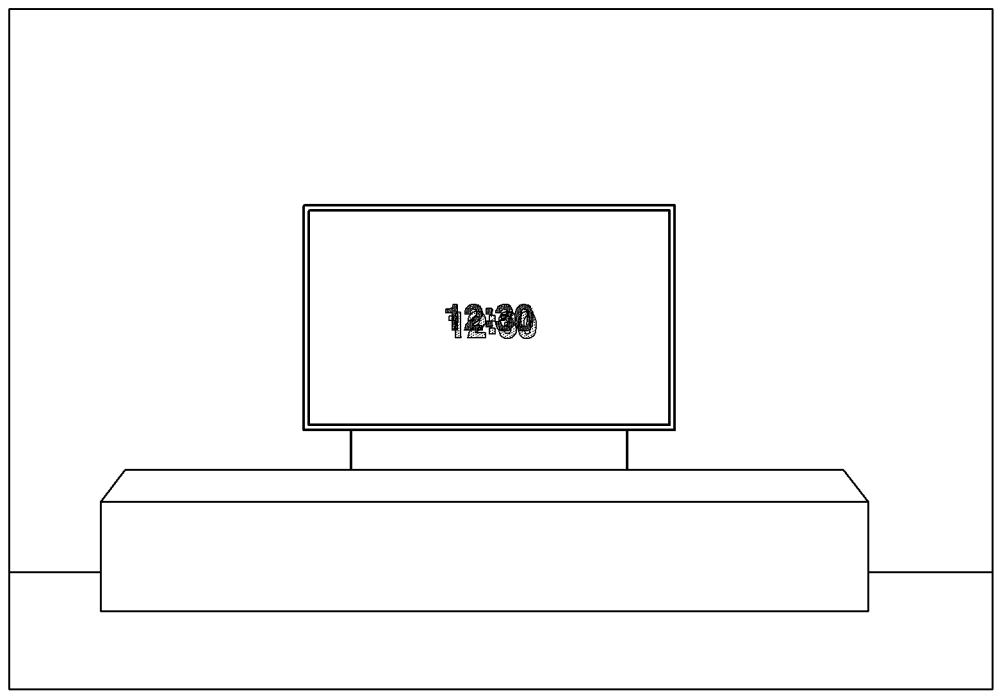
Figure 9B:
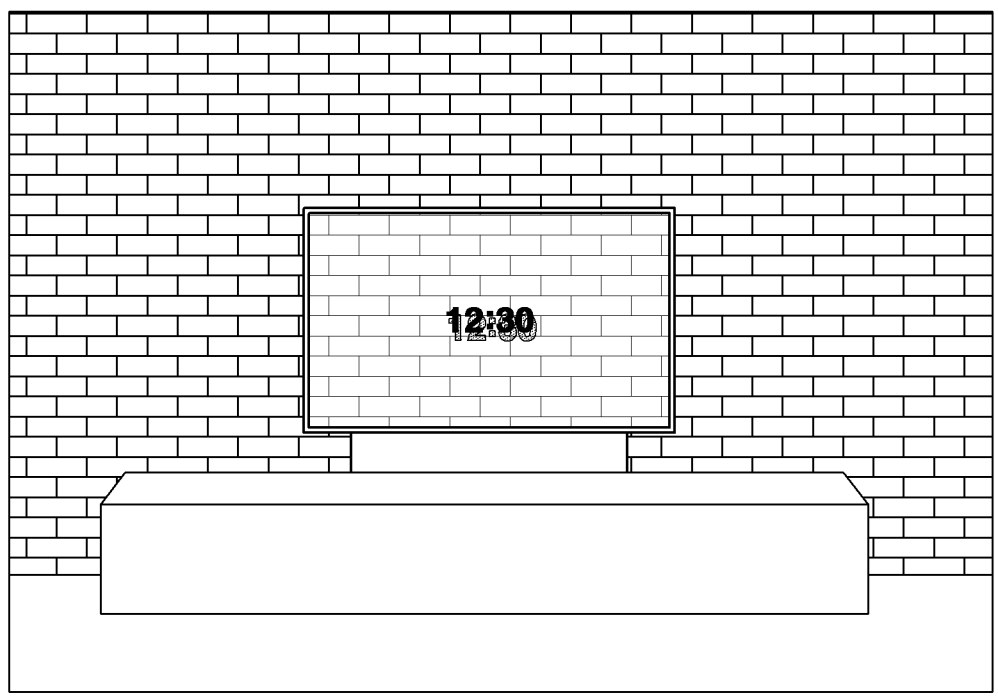

For example, the processor 130 may generate a graphic object and a shadow of the graphic object which have different contrasts if a background image does not include a pattern as shown in FIG. 9A and if the background image includes a pattern as shown in FIG. 9B so that a graphic image may be further clearly seen according to a pattern of the background image.

Exemplary embodiments of an operation of the display apparatus 100 that corrects and displays a defect area in a background image displayed through the display apparatus 100 will be described below.

FIG. 10 illustrates an exemplary embodiment in which a defect area, which exists behind the display apparatus 100, is displayed on the display apparatus 100.

As shown in FIG. 10, if a defect area 21, which spoils a desired view, for example a nail mark, a power socket, a stain, an area where wallpaper peels, or the like, exists on the wallpaper behind the display apparatus 100, the defect area 21 is exposed on a background image as it is.

If the defect area 21 exists in the background image as described above, the processor 130 may remove the defect area 21 in exemplary embodiments.

As described above, the display apparatus 100 may receive data about a background image of a background area behind the display apparatus 100 from the electronic device 200 through the communicator 170. Also, the display apparatus 100 may receive position data about a particular area of the background image of the background area behind the display apparatus 100 from the electronic device 200 through the communicator 170. Therefore, the memory 165 may store the data about the background image of the background area behind the display apparatus 100 and the position data about the particular area of the background image of the background area behind the display apparatus 100, wherein the data and the position data are received from the electronic device 200.

As shown in FIG. 10, the background image may include a pattern image that is repeatedly displayed at least two or more times and may be an image acquired by capturing a wall that is covered with the display apparatus 100 behind the display apparatus 100.

Here, the particular area of the background image may be an area selected by a user of the electronic device 200 and may include the defect area 21 as described with reference to FIG. 10. The particular area of the background image may also be an area including a defect area 21 automatically detected by the electronic device 200 based on image feature information.

If the data about the background image and the position data about the particular area of the background image as described above are stored in the memory 165, the processor 130 may extract an area having an image pattern matching an image pattern of a surrounding area adjacent to the particular area of the background image based on the stored data. The position data about the particular area may be data having a form of x and y coordinates indicating a position of the particular area with respect to a whole area of the background image. The processor 130 may detect feature information about the image pattern of the surrounding area and extract an area, which has an image pattern most similar to the image pattern of the surrounding area, from the background image by using the detected feature information.

For example, the processor 130 may search for another area including feature information which matches with the detected feature information by using the detected feature information. Since the feature information is difficult to completely match, if the feature information matches by a preset percentage or more, the feature information may be determined as matching. Therefore, the processor 130 may extract at least one or more areas having image patterns matching with the image pattern of the surrounding area adjacent to the particular area in the background image, or may extract merely one area having an image pattern most similar to the image pattern of the particular area.

Thereafter, the processor 130 may determine a corresponding area corresponding to the particular area in a background area based on the extracted area, generate a background area in which the particular area is replaced with the determined corresponding area, and display the background area on the display 120. In detail, because the image pattern of the extracted area matches the image pattern of the surrounding area adjacent to the particular area, the corresponding area corresponding to the particular area exists in a position corresponding to a position of the particular area based on the extracted area. When the corresponding area is determined, the processor 130 may generate a background image, in which the particular area is changed to or replaced with the corresponding area, by changing the determined corresponding area to a form covering the particular area. Here, an existing background image may be changed to a changed background image in which a particular area is changed to a corresponding area, or a background image in which a particular area is changed to a corresponding area may be newly generated.

Exemplary embodiments including an operation of selecting a particular area of a background image and a surrounding area of the particular area in the electronic device 200 will be described in detail.

FIG. 11 illustrates an exemplary embodiment including displaying a background image of a background area behind a display apparatus in an electronic device, according to an exemplary embodiment.

As shown in FIG. 11, the electronic device 200 may receive a user manipulation command for selecting a particular area of a background image 10 while executing an application for transmitting a control command to the display apparatus 100. Referring to FIG. 11, a user may input the user manipulation command selecting a socket 51 in order to remove the socket 51 from the background image 10. The area where the socket is displayed may be referred to as a defect area, meaning an area that spoils a desired view and is defective.

FIG. 12 illustrates a particular area and a surrounding area thereof selected in an electronic device, according to an exemplary embodiment.

As shown in FIG. 12, the user may select a particular area 61 from a background image 10 displayed on a display of the electronic device 200. Here, the electronic device 200 may receive the selection of the particular area of the background image 10 and display an application execution screen for transmitting position data about the selected particular area to the display apparatus 100.

Also, the display of the electronic device 200 may include a touch display, and the user may select the particular area 61 including a defect area by performing a dragging operation in the background image 10. As shown in FIG. 12, the selected particular area 61 may be distinguished and displayed from another area according to the dragging operation.

FIG. 12 illustrates an example of a screen on which the user selects one particular area 61, but the background image 10 may include a plurality of defect areas. In this case, the user may select a plurality of particular areas.

When the particular area 61 is selected, the electronic device 200 may transmit data about the background image 10 and position data about the particular area 61 of the background image 10 to the display apparatus 100 according to a user command. The position data about the particular area 61 may be data having a form of x and y coordinates indicating a position of the particular area 61 with respect to a whole area of the background image 10. However, the position data about the particular area 61 may be image data about the particular area 61.

Hereinafter, an operation of the display apparatus 100 that receives the data about the background image 10 and the position data about the particular area 61 of the background image 10 will be described in detail.

FIG. 13 illustrates a surrounding area used to determine a corresponding area of a particular area, in detail, according to an exemplary embodiment.

The display apparatus 100 may receive the data about the background image 10 and the position data about the particular area 61 from the electronic device 200 and store the data and the position data in the memory 165. The display apparatus 100 may receive the position data about the selected particular area 61 while displaying the background image 10 by receiving the data about the background image 10 from the electronic device 200 in advance.

The processor 130 of the display apparatus 100 may detect the particular area 61 of the background image 10 based on the position data of the particular area 61 stored in the memory 165. Here, the processor 130 may determine a surrounding area adjacent to the particular area 61 as an area used to search for a corresponding area corresponding to the particular area 61 in the background image 10. Here, the processor 130 may determine another area excluding the particular area 61 from an area including the particular area 61 as a surrounding area.

As shown in FIG. 13, the processor 130 may determine an area 62 including the particular area 61 based on the selected particular area 61, and a surrounding area 63 may be an area excluding the particular area 61 from the area 62, for example a preset range of area enclosing the particular area 61. The range of the surrounding area 63 may be variously set according to exemplary embodiments. The range of the surrounding area 63 may be a range including an image pattern of a periphery of the particular area 61. Therefore, the area 62 including the particular area 61 may be set in a size including the image pattern of the periphery of the particular area 61.

FIG. 14 illustrates displaying a corresponding area, which is determined from a particular area, on a display apparatus, according to an exemplary embodiment.

The processor 130 may extract an area having an image pattern matching with an image pattern of the surrounding area 63 in the background image 10. In detail, the processor 130 may extract an area having an image pattern most similar to the image pattern of the surrounding area 63 in a pre-stored background image by using feature information about the image pattern of the surrounding area 63. Here, masking-processing may be performed with respect to the particular area 61.

Because the background image 10 includes a pattern image that is repeated at least two or more times, one area or a plurality of areas may be extracted. If a plurality of areas are extracted, the processor 130 may select one of the extracted areas according to a random process, or may select an area having an image pattern most similar to the image pattern of the surrounding area 63. Here, the processor 130 may calculate brightness data of the surrounding area 63 and select one of the plurality of extracted areas having a most similar brightness as the area having the image pattern most similar to the image pattern of the surrounding area 63 based on the calculated brightness data.

FIG. 14 illustrates one area 81 that is extracted as an area having an image pattern most similar to the image pattern of the surrounding area 63. Here, an area 83 having an image pattern of which a part is similar to the image pattern of the surrounding area 63 may be not extracted or may be excluded after being extracted.

The processor 130 may determine a corresponding area 82 corresponding to the particular area 61 based on the extracted area 81. A relative position of the corresponding area 82 with respect the extracted area 81 may be the same as a relative position of the particular area 61 with respect to the surrounding area 63.

If a plurality of particular areas are selected by the user, areas having image patterns respectively similar to image patterns of surrounding areas of the plurality of particular areas may be respectively extracted, and respective corresponding areas of the plurality of particular areas may be determined based on the respective extracted areas.

A method of extracting an area having a similar image pattern as described above may include a template matching technique achieved in OpenCV library.

FIG. 15 illustrates displaying a screen, where a particular area is changed to a determined corresponding area, on a display apparatus, according to an exemplary embodiment.

When a corresponding area 82 is determined, the processor 130 may control the display 120 to display a background image 10 in which the particular area 61 is changed to the corresponding area 82.

Here, an existing background image 10 may be changed to the background image 10 where a particular area is changed to a corresponding area or may be generated as a new background image 10 where a particular area is changed to a corresponding area. However, although the corresponding area 82 has the same image pattern as the particular area 61, brightnesses of respective areas of a wallpaper may be different from one another according to a position, an angle, and the like, of lighting in a place where the display apparatus 100 is positioned. For example, a wallpaper area at a close distance from lighting may be relatively brighter than a wallpaper area at a long distance from the lighting. Therefore, as shown in FIG. 15, a brightness difference may occur between a changed area and a surrounding area. Here, the processor 130 may perform image-processing for correcting a brightness difference between the corresponding area 82 and the particular area 61 in the background image 10.

In detail, the processor 130 may calculate brightness data of the surrounding area 63. Here, the brightness data may include a representative value of brightness, and the representative value may be determined by various definitions such as an average, a central value, a mode value, and the like. The processor 130 may correct brightness of the changed corresponding area 82 in order to enable the brightness of the changed corresponding area 82 to be similar to brightness of the surrounding area 63 based on the calculated brightness data of the surrounding area 63. For example, the processor 130 may correct the brightness of the corresponding area 82 in order to enable a representative value of the brightness of the corresponding area 82 to be the same as a representative value of the brightness of the surrounding area 63.

The above-described brightness correction may be achieved through the OpenCV library.

FIG. 16 illustrates a method of applying a blending effect on a display apparatus, according to an exemplary embodiment.

Although the brightness of the changed corresponding area 82 is corrected according to the process described with reference to FIG. 15, the corresponding area 82 and the surrounding area 63 may be distinguished from each other according to a slight brightness difference between pixels existing on a boundary between the corresponding area 82 and the surrounding area 63. Therefore, the processor 130 may perform a secondary correction with respect to brightness by applying a blending effect to the surrounding area 63 based on corrected brightness data of the changed corresponding area 82 and brightness data of the surrounding area 63.

For example, with reference to FIG. 16, the blending effect may be applied by Equation 1 below:

$$x' = x\alpha + y(1-\alpha) \quad (1)$$

In equation 1, x' denotes a final luminance value of each pixel of the surrounding area 63 to which the blending effect is applied. x denotes a luminance value of each pixel of the surrounding area 63 to which the blending effect is not applied. y denotes a luminance value of each pixel of the corresponding area 82. Also, $\alpha$ denotes a parameter that varies according to a position of each pixel, is closer to 0 as a position of a pixel approaches the corresponding area 82, and is closer to 1 as the position of the pixel approaches the surrounding area 63.

According to Equation 1 above, if a value of $\alpha$ is 0, a pixel is very close to the corresponding area 82. Therefore, a luminance value of the corresponding pixel may be corrected according to Equation x'=y. If the value of α is 1, a pixel is very close to the surrounding area 63, and thus a luminance value of the corresponding pixel may be corrected according to Equation x'=x. In other words, according to Equation 1 above, a pixel close to the corresponding area 82 is closer to a luminance value of the corresponding area 82. Also, a pixel close to the surrounding area 63 is closer to a luminance value of the surrounding area 63. Therefore, a natural blending effect may be applied.

According to the above-described process, the display apparatus 100 may display a natural background image from which a defect area is removed.

The above-described blending effect may be achieved through the OpenCV library.

Hereinafter, an operation of the display apparatus 100 that corrects and displays a background image displayed through the display apparatus 100 according to an exemplary embodiment will be described in detail.

If correction data about a background image is received from the electronic device 200, the processor 130 may correct the background image based on the received correction data. Thereafter, the processor 130 may control the image signal generator 160 and the display 120 to display the corrected background image.

According to an exemplary embodiment, correction data may be data that is generated by comparing a display area displaying a background image and a surrounding area in a captured image acquired by capturing an area including the display apparatus 100 displaying the background image.

The correction data may include a correction value for matching a pixel value of the display area with a pixel value of the surrounding area by comparing the pixel values of the display area and the surrounding area.

In detail, the correction data may include a correction value for matching a pixel value of at least one pixel included in a preset first area of the display area with a pixel value of at least one pixel included in a preset second area of the display area by comparing the pixel value of the at least one pixel included in the preset first area and the pixel value of the at least one pixel included in the preset second area.

Therefore, the processor 130 may correct a background image pre-stored in the memory 165 based on a correction value included in correction data. Thereafter, the processor 130 may control the image signal generator 160 and the display 120 to display the corrected background image.

According to another exemplary embodiment, correction data may include area information about a background image and area information about a surrounding area in a captured image.

In exemplary embodiments, the processor 130 distinguishes a background area displayed in a background image from a surrounding area based on the area information included in the correction data. Thereafter, the processor 130 compares a pixel difference between the background area and the surrounding area that are distinguished from each other. If it is determined that the pixel difference occurs between the background area and the surrounding area according to the comparison result, the processor 130 generates a correction value for matching a pixel value of the background area with a pixel value of the surrounding area. Thereafter, the processor 130 may control the image signal generator 160 and the display 120 to correct the background image stored in the memory 165 based on the generated correction value and display the corrected background image on a screen.

As described above, if correction data as described above is received from the electronic device 200 through the communicator 170 while displaying the corrected background image, the processor 130 may control the image signal generator 160 and the display 120 to re-correct the corrected background image based on the received correction data and display the re-corrected background image on the screen.

Exemplary embodiments of the electronic device 200 are described below.

FIG. 17 is a block diagram of the electronic device 200, according to an exemplary embodiment. FIG. 18 is a detailed block diagram of the electronic device 200, according to an exemplary embodiment.

Referring to FIG. 17, an exemplary embodiment of the electronic device 200 includes a display 210, a communicator 220, and a processor 230.

The display 210 is an element that displays a screen for selecting a particular area from the background image 10. A detailed structure of the display 210 may be the same as or similar to that of the display 120 of the display apparatus 100, and thus a detailed description thereof is omitted.

The communicator 220 is an element that performs a communication with the display apparatus 100. In detail, the communicator 220 may transmit the background image 10 and position data about the particular area selected from the background image 10 to the display apparatus 100 under control of the processor 230. A detailed structure of the communicator 220 may correspond to that of the communicator 170 of the display apparatus 100, and thus a detailed description thereof is omitted.

The processor 230 may control the communicator 220 to calculate the position data about the particular area selected from the background image 10 by a user and transmit the background image 10 and the calculated position data to the electronic device 200.

According to an exemplary embodiment, a process of removing a defect area from the background image 10 may be performed by the electronic device 200.

For example, the processor 230 may display the background image 10 of a background area behind the display apparatus 100 on the display 210 and receive a selection input of the particular area of the background image 10 from the user. If the particular area is selected, the processor 230 may extract an area having an image pattern matching with an image pattern of a surrounding area adjacent to the selected particular area and determine a corresponding area corresponding to the particular area in the background image 10 based on the extracted area. If the corresponding area is determined, the processor 230 may control the communicator 220 to generate the background image 10 in which the particular area is changed to the determined corresponding area and transmit the generated background image 10 to the display apparatus 100. Here, the display apparatus 100 displays the received background image 10.

For example, the electronic device 200 may capture the background image 10 of the background area behind the display apparatus 100 through a camera 240, which may be an image capturing unit. Here, the camera 240 may capture an image of the background that will be covered with the display apparatus while the display apparatus is not installed.

The processor 230 may determine another area excluding the particular area from an area including the particular area as a surrounding area, and extract an area having an image pattern most similar to an image pattern of the surrounding area from the background image by using feature information about the image pattern of the surrounding area. In addition, the processor 230 may equally perform image-processing that is performed with respect to the background image 10 by the processor 130 of the display apparatus 100.

Exemplary embodiments of an operation of the electronic device 200 that generates correction data about a background image are described below.

As shown in FIG. 18, the camera 240 include a lens and an image sensor, and captures an image by being disposed on a back side of the electronic device 200, for example on a side opposite to a side on which the display 210 is disposed. In particular, the camera 240 may capture a view from a rear side of the display apparatus 100, such as background area behind the display apparatus 100, including an area of a background image that is to be displayed through the display apparatus 100.

As described above, the background image captured through the camera 240 may be stored in a memory 260.

The processor 230 controls the camera 240 to capture an area including the display apparatus 100 displaying a background image corresponding to a background area of a wall according to a user command. According to such a control command, the camera 240 captures an image of the area including the display apparatus 100 displaying the background image connected to the background of the wall.

If an image of the area including the display apparatus 100 displaying the background image is captured, the processor 230 distinguishes a background area displayed in the background image from a surrounding area in the captured image.

According to an exemplary embodiment, the processor 230 may distinguish a preset first area of a captured image a background area displayed in a background image, and a second area as a surrounding area.

According to another exemplary embodiment, the display apparatus 100 may display indicators for identifying a background image displayed on a screen and the display apparatus 100. Therefore, the processor 230 may distinguish a background area displayed in the background image from a surrounding area by using the indicators displayed in the captured image.

When the background area displayed in the background image and the surrounding area are distinguished from each other through the above-described exemplary embodiment, the processor 230 controls the communicator 220 to generate correction data about the background image by comparing the background area and the surrounding area distinguished from each other in the captured image and transmit the generated correction data to the display apparatus 100.

Therefore, the communicator 220 may transmit the correction data about the background image to the display apparatus 100, and the display apparatus 100 may display a corrected background image, which is corrected based on the correction data received from the electronic device 200, on the screen.

Exemplary embodiments of an operation of the processor 230 that generates correction data about a background image are described in detail below.

According to an exemplary embodiment, if a background area and a surrounding area are distinguished from each other in a captured image, the processor 230 may correct a pre-stored background image based on pixel values of the distinguished background area and surrounding area and generate correction data including the corrected background image.

In other words, the processor 230 may generate a correction value for matching a pixel value of the background area with a pixel value of the surrounding area by comparing the pixel values of the background area and the surrounding area.

For example, the processor 230 compares a pixel value of at least one pixel included in a preset first area of the background area displayed in the background image with a pixel value of at least one pixel included in a preset second area of the surrounding area. If the two pixel values are different from each other according to the comparison result, the processor 230 generates a correction value for matching the pixel value of the at least one pixel included in the first area with the pixel value of the at least one pixel included in the second area.

Thereafter, the processor 230 corrects the pre-stored background image based on the generated correction value, generates correction data including the corrected background image, and transmits the generated correction data to the display apparatus 100 through the communicator 220. Therefore, the display apparatus 100 may display the corrected background image, which is corrected based on the correction data received from the electronic device 200, on the screen.

According to another exemplary embodiment, as described above, the processor 230 may generate correction data including a correction value generated to match a pixel value of a background area with a pixel value of a surrounding area and transmit the generated correction data to the display apparatus 100 through the communicator 220.

In this case, the display apparatus 100 may correct a pre-stored background image based on a correction value included in correction data received from the electronic device 200 and display the corrected background image on the screen.

According to another exemplary embodiment, the processor 230 may generate correction data including area information about a background area and another area distinguished from each other in a captured image and data about the captured image and transmit the generated correction data to the display apparatus 100 through the communicator 220.

In this case, the display apparatus 100 distinguishes the background area from the surrounding area in the background image based on the area information included in the correction data received from the electronic device 200 and generates a correction value for matching a pixel value of the background area with a pixel value of the surrounding area by comparing the pixel values of the distinguished background area and surrounding area.

According to an exemplary embodiment, the display apparatus 100 compares a pixel value of at least one pixel included in a preset first area of a background area displayed in a background image with a pixel value of at least one pixel included in a preset second area of a surrounding area. If the two pixel values are different from each other according to the comparison result, the processor 230 may generate a correction value for matching the pixel value of the at least one pixel included in the first area with the pixel value of the at least one pixel included in the second area.

If the correction value is generated, the display apparatus 100 may correct a pre-stored background image based on the generated correction value and display the corrected background image on a screen.

If a corrected background image is generated according to various exemplary embodiments described above, the display apparatus 100 displays the corrected background image on the screen. Therefore, a problem of a background image displayed on the screen of the display apparatus 100 appearing differently than a background of a wall where the display apparatus 100 is installed, due to a change in a state of the display apparatus 100, for example a color temperature applied to the display apparatus 100, or a change in a surrounding environment state, for example a luminance change, may be solved.

The processor 230 may control the camera 240 to capture an area including the display apparatus 100 displaying a corrected background image according to a user command. According to such a control command, the camera 240 captures an area including the display apparatus 100 displaying a corrected background image. Thereafter, according to above-described exemplary embodiments, the processor 230 may distinguish a background area displayed in the corrected background image from a surrounding area in the captured image and re-correct a previously corrected background image based on a pixel difference between the distinguished background area and surrounding area.

The electronic device 200 may further include a speaker 250, the memory 260, and a sensor 270 as shown in FIG. 18.

The detailed structure of the electronic device 200 shown in FIG. 18 is merely an exemplary embodiment, and thus some of elements of the electronic device 200 shown in FIG. 18 may be omitted, changed, or added according to a type or a use purpose of the electronic device 200.

The camera 240 that captures the above-described image may be a dual camera having a plurality of camera modules or may include one camera module. Also, the display 210 may display the above-described background image, and contents and various types of user interfaces (UIs) received from an external source.

The speaker 250 may output various types of audio data, on which various types of processing jobs, such as decoding, amplifying, noise filtering, and the like, are performed by an audio processor, various types of notification sounds, or voice messages. If an application for providing a transparent display through the display apparatus 100 is executed, the speaker 250 may provide a guide message related to the corresponding application in an audio form.

The memory 260 stores various types of modules for driving the electronic device 200.

For example, the memory 260 may further store an operation program for controlling an operation of the electronic device 200. Here, if the electronic device 200 is turned on or activated, the operation program may be a program that is read from the memory 260 and compiled to operate each element of the electronic device 200.

Also, the memory 260 may store software including a base module, a sensing module, a communication module, a presentation module, a web browser module, and a service module, according to an exemplary embodiment. Here, the base module is a base module that processes signals respectively transmitted from pieces of hardware included in the electronic device 200 and transmits the processed signals to an upper layer module. The sensing module may be a module that collects information from various types of sensors, and analyzes and manages the collected information and may include a face recognition module, a voice recognition module, a motion recognition module, a Near Field Communication (NFC) module, and the like. The presentation module may be a module that constitutes a display screen and may include a multimedia module for reproducing and outputting a multimedia content and a UI rendering module for performing UI and graphic processing. The communication module is a module that performs a communication with an external source. The web browser refers to a module that accesses a web server by performing web browsing. The service module is a module that includes various types of applications for providing various types of services.

As described above, the memory 260 may include various types of program modules, and some of the various types of program modules may be omitted, changed, or added according to a type and a characteristic of the electronic device 200. The memory 260 may also store execution program-related information about an application for providing a transparent display through the display apparatus 100.

The sensor 270 may include various types of sensors for sensing a user command. For example, the sensor 270 may include a touch sensor. The sensor 270 may also sense various types of information by using various types of sensors. For example, the sensor 270 may sense motion information by using a motion sensor, for example an acceleration sensor, a gyro sensor, a geomagnetic sensor, or the like.

Exemplary embodiments of an operation of the electronic device 200 that corrects a background image displayed through the display apparatus 100 according to an exemplary embodiment are described in detail below.

FIG. 19 illustrates distinguishing a background area displayed in a background image in an electronic device, according to an exemplary embodiment.

As described in exemplary embodiments above, while executing an application for providing a transparent display through the display apparatus 100, the electronic device 200 captures a background corresponding to a user command and transmits data about the captured background image to the display apparatus 100. Therefore, as shown in FIG. 19, the display apparatus 100 displays a background image 10 of a background area corresponding to a background of a wall where the display apparatus 100 is installed, based on the data of the background image received from the electronic device 200.

The electronic device 200 acquires an image of an area including the display apparatus 100 displaying the background image 10 by capturing the corresponding area according to a user command. For example, the electronic device 200 provides a guide UI 1910 for guiding an area, where the display apparatus 100 is installed, to be included in a first area of a screen.

Thereafter, the electronic device 200 captures an image in which that the guide UI 1910 displayed on the screen of the electronic device 200 includes an image 10' of the display apparatus 100. If such an image is captured, the electronic device 200 may determine a first area included in the guide UI 1910 as a background area of the background image 10' and a second area as a surrounding area by analyzing the captured image.

FIG. 20 illustrates distinguishing a background area displayed in a background image in an electronic device, according to another exemplary embodiment.

While executing an application for providing a transparent display through the display apparatus 100 as described above, the electronic device 200 captures a background corresponding to a user command and transmits data about the captured background image to the display apparatus 100. Therefore, as shown in FIG. 20, the display apparatus 100 displays a background image 10 of a background connected to a background of a wall where the display apparatus 100 is installed, based on the data of the background image received from the electronic device 200.

Here, the display apparatus 100 displays a plurality of indicators 2010 for distinguishing a display area displaying the background image 10 from another area on the screen displaying the background image 10.

The electronic device 200 captures an area including the display apparatus 100 displaying the background image 10 including the indicators 2010 according to a user command. Thereafter, the electronic device 200 may determine a background area displayed in a background image and determine another area as a surrounding area by extracting an outer part of the display apparatus 100 from the captured image through indicators 2010' displayed in the captured image.

FIG. 21 illustrates correcting a background image in an electronic device, according to an exemplary embodiment. FIG. 22 illustrates correcting a background image in an electronic device, according to another exemplary embodiment.

While executing an application for providing a transparent display through the display apparatus 100 as described above, the electronic device 200 captures a background corresponding to a user command and transmits data about the captured background image to the display apparatus 100. Therefore, as shown in FIG. 21, the display apparatus 100 displays a background image on a screen based on the data received from the electronic device 200.

After the background image is captured through the electronic device 200, an electric lamp 2110 positioned at a location where the display apparatus 100 is installed may be turned on. As a result, a surrounding brightness of a wall where the display apparatus 100 is installed may brighten by the light of the electric lamp 2110. If the surrounding brightness of the wall where the display apparatus 100 is installed brightens as described above, a background image displayed through the display apparatus 100 may be displayed as appearing relatively darker than a background of the wall where the display apparatus 100 is installed.

In exemplary embodiments, the electronic device 200 may correct a background image displayed through the display apparatus 100.

For example, the electronic device 200 captures an area including the display apparatus 100 displaying a background image according to a user command. If an image of the area including the display apparatus 100 displaying the background image is captured, the electronic device 200 distinguishes a background area displayed in the background image from a surrounding area in the captured image according to the above-described exemplary embodiment.

Thereafter, the electronic device 200 compares a pixel value of at least one pixel included in a preset first area 2120 of the background image 10 with a pixel value of at least one pixel included in a preset second area 2120' of the surrounding area, wherein the background image 10 and the surrounding area are distinguished from each other in the captured image.

For example, the electronic device 200 calculates an average value, such as a first average value, from a pixel value of a pixel included in an area corresponding to arbitrary 10×10 group among a plurality of pixels included in a background area. The electronic device 200 also calculates an average value, for example a second average value, from a pixel value of a pixel included in an area corresponding to arbitrary 10×10 group among a plurality of pixels included in a surrounding area. Thereafter, the electronic device 200 compares the first average value calculated in the background image with the second average value calculated in the surrounding area. If the first and second average values are different from each other according to the comparison result, the electronic device 200 generates a correction value for matching the first average value with the second average value.

As shown in FIG. 22, the electronic device 200 divides a background image 10, which is distinguished from a captured image, into a plurality of areas including first area 2210, second area 2220, third area 2230, and fourth area 2240. Thereafter, the electronic device 200 determines a plurality of areas including first area 2210', second area 2220', third area 2230', and fourth area 2240' of a surrounding area respectively adjacent to the first through fourth areas 2210 through 2240.

Thereafter, the electronic device 200 respectively compares pixel values of the first through fourth areas 2210 through 2240 with pixel values of the first through fourth areas 2210' through 2240' respectively adjacent to the first through fourth areas 2210 through 2240.

For example, the electronic device 200 acquires respective average values of the first through fourth areas 2210 through 2240 from a pixel value of a pixel included in an area corresponding to an arbitrary 3×3 group among a plurality of pixels included in each of the first through fourth areas 2210 through 2240. The electronic device 200 also acquires respective average values of the first through fourth areas 2210' through 2240' from a pixel value of a pixel included in each of the first through fourth areas 2210' through 2240' of the surrounding area corresponding to an arbitrary 3×3 group and respectively adjacent to the first through fourth areas 2210 through 2240. Thereafter, the electronic device 200 respectively compares the average values of the first area 2210 and the first area 2210', the average values of the second area 2220 and the second area 2220', the average values of the third area 2230 and the third area 2230', and the average values of the fourth area 2240 and the fourth area 2240'. If the average value of the first area 2210 of the first through fourth areas 2210 through 2240 is different from the average value of the first area 2210' adjacent to the first area 2210 according to the comparison result, the electronic device 200 generates a correction value for matching the average value of the first area 2210 with the average value of the first area 2210'.

If the correction value is generated according to the present exemplary embodiment, the electronic device 200 corrects a pre-stored background image based on the generated correction value and transmits the corrected background image to the display apparatus 100. Therefore, the display apparatus 100 may display a background image having similar brightness to a background of a wall that brightens by a light of the electric lamp 2310. As the corrected background image is displayed, the user may be provided with a visual effect of providing a transparent display through which a background of a wall where the display apparatus 100 is installed appears as being connected to a surrounding background.

FIGS. 23A and 23B illustrate displaying a corrected background image on a display apparatus, according to an exemplary embodiment.

As shown in FIG. 23A, after a background image is captured through the electronic device 200, an electric lamp 2310 positioned at a location where the display apparatus 100 is installed may be turned on. In this case, brightness of a background 2320 of a wall where the display apparatus 100 is installed may brighten by the light of the electric lamp 2310. If surrounding brightness of the wall where the display apparatus 100 is installed brightens as described above, a background image 2330 displayed through the display apparatus 100 may be displayed as appearing relatively darker than the background 2320 of the wall where the display apparatus 100 is installed.

However, as described above, if a background image is corrected through the electronic device 200, as shown in FIG. 23B, a background image 2330' displayed through the display apparatus 100 may have similar brightness to a background 2320' of the wall brightened by a light the electric lamp 2310. As the corrected background image is displayed, the user may be provided with a visual effect of providing a transparent display through which a background of the wall where the display apparatus 100 is installed appears as being connected to a surrounding background.

The elements of the display apparatus 100 and the electronic device 200 according to an exemplary embodiment are described in detail above. Methods of controlling the display apparatus 100 and the electronic device 200 according to an exemplary embodiment are described in detail below.

FIGS. 24 and 25 are flowcharts of a method of controlling a display apparatus, according to exemplary embodiments.

If a background image including a content screen is displayed on the display apparatus 100, the display apparatus 100 stores data about the background image of a background area behind the display 120 in operation S2410 as shown in FIG. 24. Here, the data about the background image of the background area behind the display apparatus 100 may be acquired by an external portable terminal or by a camera connected to the display apparatus 100.

In operation S2420, the display apparatus 100 acquires sensing data about at least one of a direction and an intensity of external light projected onto the display 120 from an external light source disposed around the display 120.

In operation S2430, the display apparatus 100 generates and displays a content screen based on the data about the background image and the sensing data. Here, the content screen may include a graphic object and a shadow of the graphic object on the background image. Also, the shadow of the graphic object may be changed according to the direction and the intensity of the external light acquired by the sensing data.

According to various exemplary embodiments as described above, a user may be provided with a content screen adaptively including a background image according to a surrounding environment without using a high-priced transparent display.

If the display apparatus 100 displays a background image from which a defect area is removed, the display apparatus 100 receives a background image of a background area behind the display apparatus 100 and position data about a particular area of the background image from the electronic device 200 in operation S2510 as shown in FIG. 25. Here, the background image may include a pattern image that is repeated at least two or more times, and the particular area may be at least one area selected by a user of the electronic device 200.

In operation S2520, the display apparatus 100 extracts an area having an image pattern matching with an image pattern of a surrounding area adjacent to the particular area in the received background image based on the position data about the particular area. Here, the display apparatus 100 may set another area excepting the particular area from an area including the particular area as a surrounding area. Thereafter, the display apparatus 100 may extract an area having an image pattern most similar to an image pattern of a surrounding area in the received background image by using feature information about the image pattern of the surrounding area.

In operation S2530, the display apparatus 100 determines a corresponding area corresponding to the particular area in the background image based on the extracted area.

In operation S2540, the display apparatus 100 displays a background image in which the particular area is changed to the corresponding area.

Thereafter, the display apparatus 100 may calculate brightness data of the surrounding area and correct brightness of the changed corresponding area based on the calculated brightness data.

Also, the display apparatus 100 may apply a blending effect based on the corrected brightness data of the changed corresponding area and brightness data of the surrounding area.

FIGS. 26 through 28 are flowcharts of a method of controlling an electronic device, according to exemplary embodiments.

In order to display a background image, from which a defect area is removed, on the display apparatus 100, the electronic device 200 displays a background image of a background area behind the display apparatus 100 in operation S2610 as shown in FIG. 26.

If a particular area of the background image is selected by a user, the electronic device 200 extracts an area having an image pattern matching with an image pattern of a surrounding area adjacent to the selected particular area in operation S2620.

In operation S2630, the electronic device 200 determines a corresponding area of the particular area in the background image based on the extracted area.

In operation S2640, the electronic device 200 generates a background image where the particular area is changed to the determined corresponding area. In operation S2650, the electronic device 200 transmits the generated background image to the display apparatus 100.

According to various exemplary embodiments as described above, there may be displayed an image of a wall from which an area spoiling a desired view like a nail mark, a power socket, a stain, or the like is removed. Therefore, an interior effect of providing a more desirable view may be produced.

In order to display a corrected background image on the display apparatus 100, the electronic device 200 executes an application for providing a transparent display through the display apparatus 100 as shown in FIG. 27. When executing the application as described above, the electronic device 200 captures a background image that is to be displayed on the display apparatus 100 in operation S2710. In operation S2720, the electronic device 200 transmits data about the captured background image to the display apparatus 100. Here, the electronic device 200 stores the captured background image in a memory.

The display apparatus 100 that receives the data about the background image from the electronic device 200 displays the background image on a screen based on the received data. In operation S2730, the electronic device 200 captures an area including the display apparatus 100 displaying the background image according to a user command.

In operation S2740, the electronic device 200 generates correction data about the background image by comparing a background area displayed in the background image with a surrounding area in the captured image. In operation S2750, the electronic device 200 transmits the correction data about the background image to the display apparatus 100. Therefore, the display apparatus 100 may display the background image, which is corrected based on the correction data received from the electronic device 200, on the screen.

The electronic device 200 re-captures the area including the display apparatus 100 displaying the corrected background image according to a user command. Thereafter, the electronic device 200 may re-correct the background image and transmit correction data about the re-corrected background image to the display apparatus 100 by repeatedly performing a series of operations described above.

The electronic device 200 may generate correction data about the background image through a processing operation as follows.

As shown in FIG. 28, if an image of an area including the display apparatus 100 displaying a background image is captured, the electronic device 200 distinguishes a background area displayed in the background image from a surrounding area in the captured image in operation S2810.

According to an exemplary embodiment, the display apparatus 100 may display indicators for identifying the display apparatus 100 together on the background image. Therefore, if an image of an area including the display apparatus 100 displaying the background image is captured, the electronic device 200 may distinguish the background area displayed in the background image from a surrounding area by using the indicators displayed on the captured image.

According to another exemplary embodiment, if an image of an area including the display apparatus 100 displaying a background image is captured, the electronic device 200 may distinguish a preset first area as a background area displayed in the background image and a second area as a surrounding area in the captured image.

When the background area and the surrounding area are distinguished from each other in the captured image as described above, the electronic device 200 compares pixel values of the background area and the surrounding area in operation S2820. In detail, the electronic device 200 may compare a pixel value of at least one pixel included in the preset first area of the background area with a pixel value of at least one pixel included in the preset second area of the surrounding area.

If the two pixel values are different from each other according to the comparison result, the electronic device 200 generates a correction value for matching a pixel value of the background area with a pixel value of the surrounding area in operation S2830.

Thereafter, the electronic device 200 corrects a pre-stored background image based on the generated correction value and transmits correction data including data about the corrected background image to the display apparatus 100. Therefore, the display apparatus 100 may display the background image corrected based on the correction data received from the electronic device 200.

If the correction value is generated in operation S2430 described above, the electronic device 200 may transmit correction data including the generated correction value to the display apparatus 100. If the correction data is received, the display apparatus 100 may correct a pre-stored background image based on the correction value included in the received correction data and display the corrected background image on a screen.

A method of controlling the electronic device 200 according to various exemplary embodiments described above may be coded as software and then stored on a non-transitory readable medium. The non-transitory readable medium may be mounted and used on various types of devices.

The non-transitory readable medium is a medium which does not store data temporarily such as a register, cache, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A display apparatus comprising:
a display;
at least one sensor configured to generate sensing data relating to at least one from among a direction and an intensity of external light projected onto the display from an external light source disposed around the display;
a memory storing background image data relating to a background image of a background area behind the display; and
a processor configured to:
generate a content screen based on the background image data and the sensing data and
control the display to display the content screen,
wherein the content screen comprises at least one graphic object and a shadow corresponding to the at least one graphic object disposed on the background image, and a position of the shadow is changed according to a change of the direction of the external light based on the sensing data.

2. The display apparatus of claim 1, further comprising:
a bezel disposed at an edge of the display; and
an outer frame configured to cover the bezel,
wherein the processor is further configured to control the display to display an outer frame shadow in an area at an edge of the content screen, the edge corresponding to the outer frame.

3. The display apparatus of claim 1, wherein the content screen comprises an object layer including the at least one graphic object, a shadow layer including the shadow, and a background image layer including the background image.

4. The display apparatus of claim 3, wherein the processor is further configured to control the display to sequentially arrange the background image layer, the shadow layer, and the object layer, so that the object layer, the shadow layer, and the background image layer are sequentially displayed from a front position.

5. The display apparatus of claim 1, wherein the processor is further configured to perform an image correction with respect to the at least one graphic object according to at least one of the direction and the intensity of the external light sensed by the at least one sensor.

6. The display apparatus of claim 5, wherein in response to a plurality of graphic objects being included in the content screen, the processor is further configured to perform a plurality of image corrections with respect to the plurality of graphic objects according to a plurality of types of the plurality of graphic objects.

7. The display apparatus of claim 1, wherein the processor is further configured to generate the shadow based on whether the background image includes a pattern.

8. The display apparatus of claim 1, wherein the processor is further configured to operate in one of a background mode and a normal mode, and to control the display to display a content screen including the background image while operating in the background mode.

9. The display apparatus of claim 1, wherein the memory is further configured to store position data relating to a first area of the background image, the first area being surrounded by a second area including a first image pattern,
wherein the processor is further configured to extract a third area, which includes a second image pattern matching the first image pattern, from the background image, based on the position data relating to the first area, determine a fourth area corresponding to the first area in the background image based on the extracted third area, and control the display to display a corrected background image in which the first area is replaced by the fourth area.

10. The display apparatus of claim 9, wherein the background image comprises a repeated image pattern that is repeated at least twice,
wherein the first area is at least one area selected by a user.

11. The display apparatus of claim 9, wherein the processor is further configured to determine an area excluding the first area as the second area.

12. The display apparatus of claim 9, wherein the processor is further configured to extract the third area, from the background image as a result of determining that the first image pattern matches the second image pattern using feature information of the first image pattern.

13. The display apparatus of claim 9, wherein the processor is further configured to calculate brightness data of the second area, and to correct a brightness of the fourth area based on the calculated brightness data.

14. The display apparatus of claim 13, wherein the processor is further configured to apply a blending effect based on the corrected brightness of the fourth area and the brightness data of the second area.

15. The display apparatus of claim 1, further comprising:
a communicator configured to perform a data communication with an electronic device,
wherein in response to correction data of the background image being received from the electronic device, the processor is further configured to correct the background image based on the received correction data.

16. The display apparatus of claim 15, wherein the correction data is generated by comparing a display area displaying the background image with a surrounding area in an correction image acquired by capturing an area comprising the display apparatus displaying the background image.

17. The display apparatus of claim 16, wherein the correction data comprises a correction value for matching a pixel value of the display area with a pixel value of the surrounding area by comparing the pixel value of the display area and the pixel value of the surrounding area.

18. The display apparatus of claim 16, wherein the correction data comprises a correction value for matching a first pixel value of at least one pixel included in a preset first area of the display area with a second pixel value of at least one pixel included in a preset second area of the surrounding area, by comparing the first pixel value with the second pixel value.

19. The display apparatus of claim 16, wherein the correction image comprises indicators for identifying the display apparatus, and distinguishing the display area displaying the background image from the surrounding area.

20. The display apparatus of claim 16, wherein in response to re-correction data relating to the corrected background image being received, the processor is further configured to re-correct the corrected background image based on the received re-correction data.

21. The display apparatus of claim 1, wherein a shade of the shadow is changed according to a change of the intensity of the external light based on the sensing data.

* * * * *